US007681761B2

(12) United States Patent
Harra

(10) Patent No.: US 7,681,761 B2
(45) Date of Patent: Mar. 23, 2010

(54) APPARATUS FOR PROCESSING, STORING, AND DISPENSING SOFT SERVE FROZEN FOOD PRODUCT

(76) Inventor: John Harra, 155 W. 81st St., New York, NY (US) 10024

( * ) Notice: Subject to any disclaimer, the term of this patent is extended or adjusted under 35 U.S.C. 154(b) by 1133 days.

(21) Appl. No.: 10/552,561

(22) PCT Filed: Apr. 13, 2004

(86) PCT No.: PCT/US2004/011484

§ 371 (c)(1),
(2), (4) Date: Oct. 11, 2005

(87) PCT Pub. No.: WO2004/091324

PCT Pub. Date: Oct. 28, 2004

(65) Prior Publication Data
US 2007/0102448 A1  May 10, 2007

Related U.S. Application Data

(60) Provisional application No. 60/462,700, filed on Apr. 15, 2003.

(51) Int. Cl.
B67D 5/62 (2006.01)
(52) U.S. Cl. ............. 222/146.6; 222/135; 222/145.5; 222/148; 62/389
(58) Field of Classification Search ........... 222/129.1, 222/129, 129.3, 148, 129.4, 144.5, 145.1, 222/145.2, 145.5, 145.6, 146.6, 135; 99/452–453, 99/456, 467; 62/346, 354, 71, 389
See application file for complete search history.

(56) References Cited

U.S. PATENT DOCUMENTS

| 2,784,565 | A |   | 3/1957  | Stalkup             |
|-----------|---|---|---------|---------------------|
| 3,050,960 | A |   | 8/1962  | Clifford            |
| 3,898,859 | A |   | 8/1975  | Duke                |
| 4,703,628 | A |   | 11/1987 | Togashi et al.      |
| 4,758,097 | A |   | 7/1988  | Iles, Sr.           |
| 4,860,550 | A |   | 8/1989  | Aoki et al.         |
| 5,016,446 | A |   | 5/1991  | Fiedler             |
| 5,030,465 | A | * | 7/1991  | Curry et al. ...... 426/474 |
| 5,151,288 | A | * | 9/1992  | Curry et al. ...... 426/474 |
| 5,158,506 | A |   | 10/1992 | Kusano et al.       |
| 5,229,150 | A | * | 7/1993  | Ahnell et al. ...... 426/231 |

(Continued)

OTHER PUBLICATIONS

PCT International Search Report, issued in the PCT International Application No. PCT/US05/36284, Nov. 27, 2006.

(Continued)

Primary Examiner—Frederick C. Nicolas
(74) Attorney, Agent, or Firm—Eugene S. Indyk

(57) ABSTRACT

Soft serve frozen food such as ice cream and frozen yogurt is pumped from a sanitary reservoir into a closed loop flow path that includes an emulsion barrel assembly that intimately mixes the ingredients in the food composition into a smooth consistency frozen food product. A dispensing head allows servings of soft serve food to be withdrawn from the closed loop. A clean-in-place system permits all critical parts of the machine that come in contact with food to be cleaned and sanitized without having to take the machine apart.

20 Claims, 18 Drawing Sheets

U.S. PATENT DOCUMENTS

| | | | |
|---|---|---|---|
| 5,356,648 A | 10/1994 | Kortschot | |
| 5,400,614 A | 3/1995 | Feola | |
| 5,419,150 A | 5/1995 | Kaiser et al. | |
| 5,433,084 A | 7/1995 | Kaiser et al. | |
| 5,615,559 A | 4/1997 | Kress et al. | |
| 5,727,713 A | 3/1998 | Kateman et al. | |
| 5,799,832 A | 9/1998 | Mayo | |
| 6,145,701 A | 11/2000 | Van Der Merwe et al. | |
| 6,490,872 B1 | 12/2002 | Beck et al. | |
| 6,494,055 B1 | 12/2002 | Meserole et al. | |
| 6,698,228 B2 | 3/2004 | Kateman et al. | |
| 7,290,682 B2 * | 11/2007 | Harra | 222/146.6 |
| 2003/0012864 A1 | 1/2003 | Gerber | |
| 2003/0071055 A1 | 4/2003 | Johnson | |
| 2004/0118291 A1 | 6/2004 | Carhuff et al. | |

OTHER PUBLICATIONS

PCT International Search Report, issued in the PCT International Application No. PCT/US04/11484, Jan. 11, 2005.

EPC Article 96(2) Communication issued in an EPO Application No. 04 759 525.1—2114, Oct. 7, 2006.

* cited by examiner

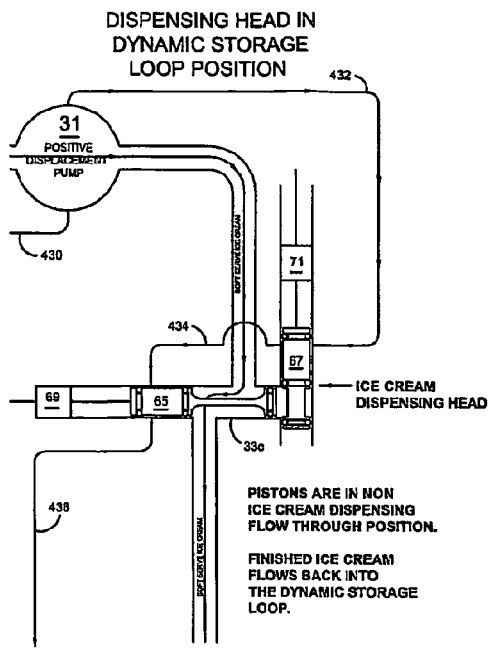

FIGURE 1A
DISPENSING HEAD IN DYNAMIC STORAGE LOOP POSITION

ICE CREAM DISPENSING HEAD

PISTONS ARE IN NON ICE CREAM DISPENSING FLOW THROUGH POSITION.

FINISHED ICE CREAM FLOWS BACK INTO THE DYNAMIC STORAGE LOOP.

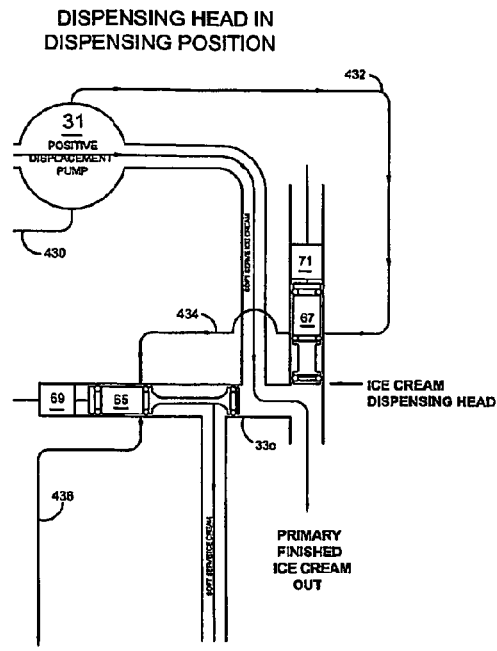

FIGURE 1B
DISPENSING HEAD IN DISPENSING POSITION

ICE CREAM DISPENSING HEAD

PRIMARY FINISHED ICE CREAM OUT

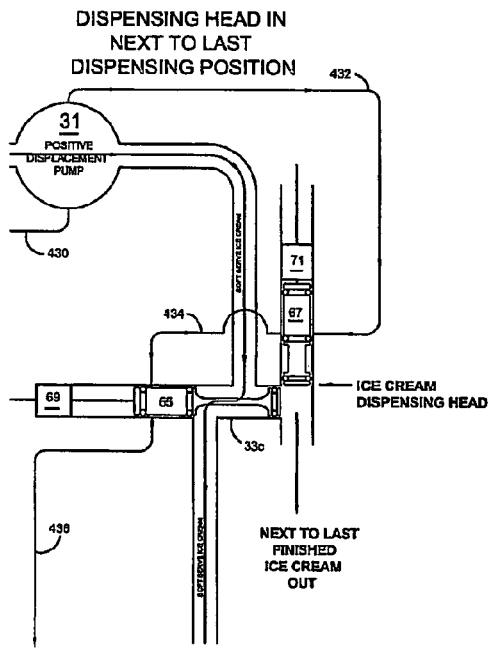

FIGURE 1C
DISPENSING HEAD IN NEXT TO LAST DISPENSING POSITION

ICE CREAM DISPENSING HEAD

NEXT TO LAST FINISHED ICE CREAM OUT

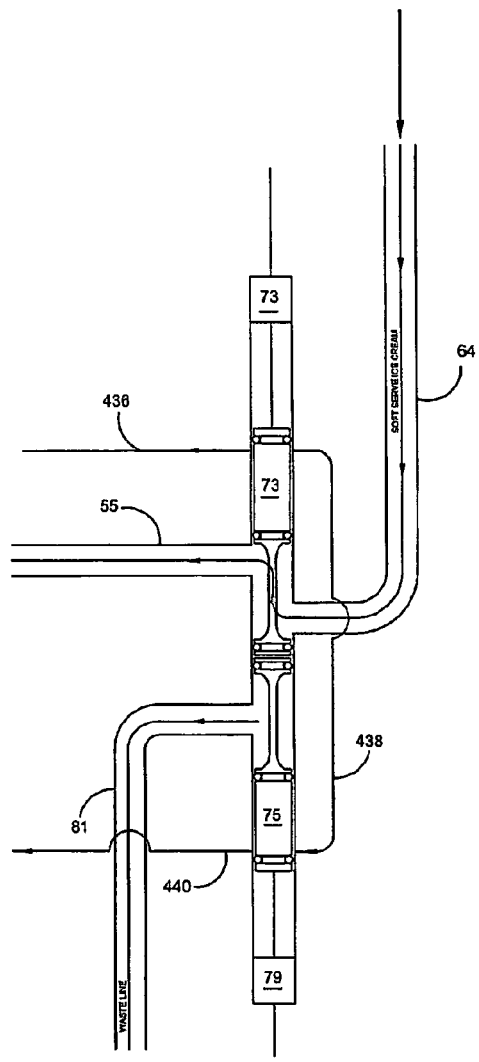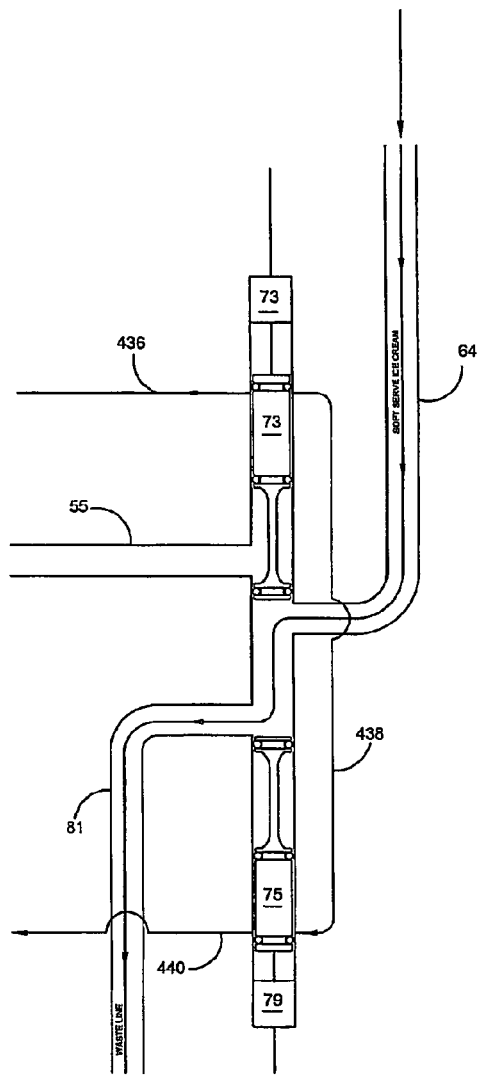

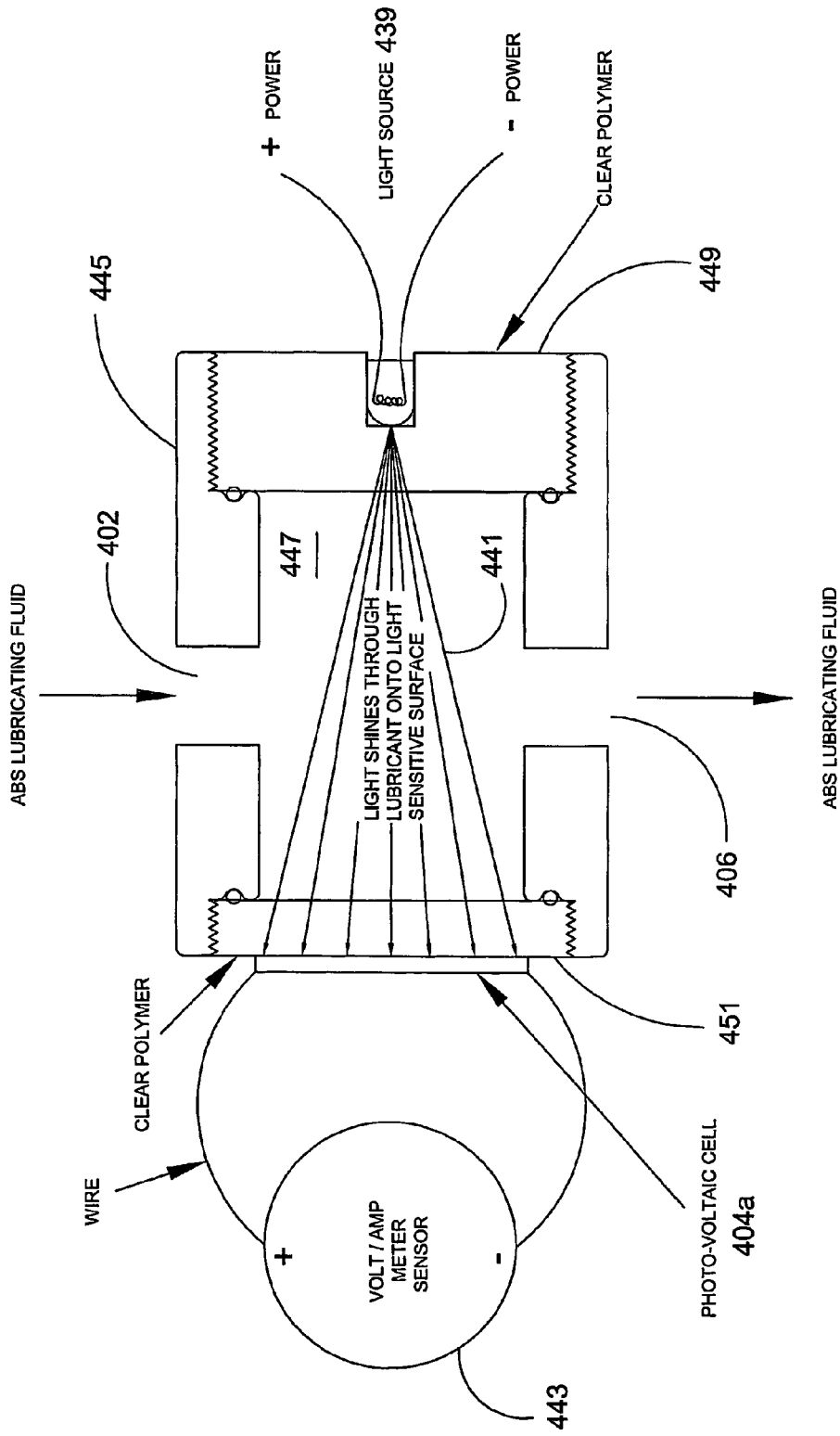

MIX STERILIZATION HEAD
IN CLOSED AND SEALED POSITION

PIERCING PISTON TIP

FULL CLEARANCE WITH FULLY RETRACTED PIERCING VALVE

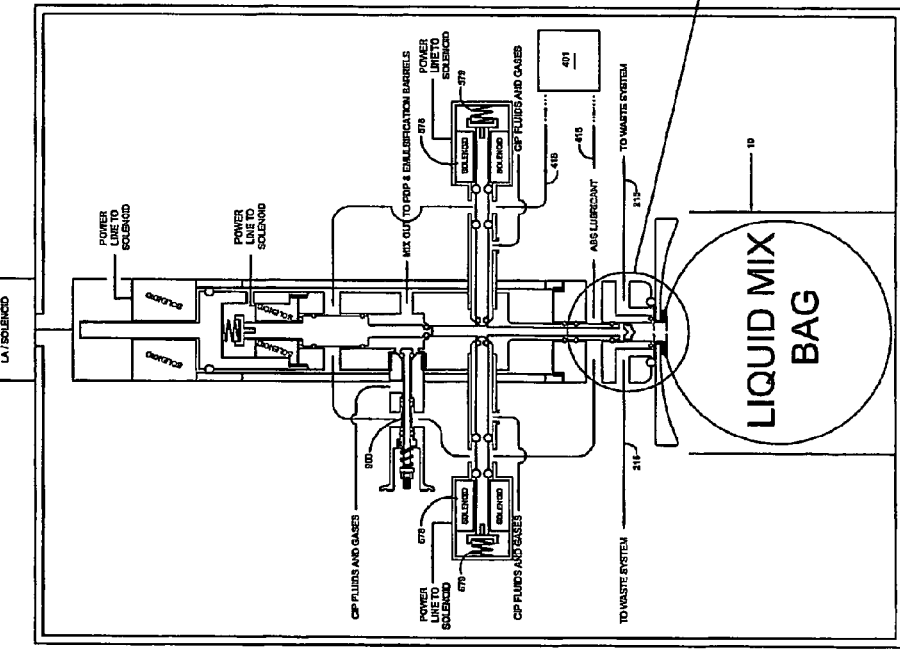

FULL PRESSURE ORING SEAL
WITH PIERCED SEAL

MIX HEAD

TOP VIEW

LIQUID / GAS
CROSS SECTION "AA"

ABS LUBRICANT
CROSS SECTION "BB"

CROSS SECTION
VIEW

BOTTOM VIEW

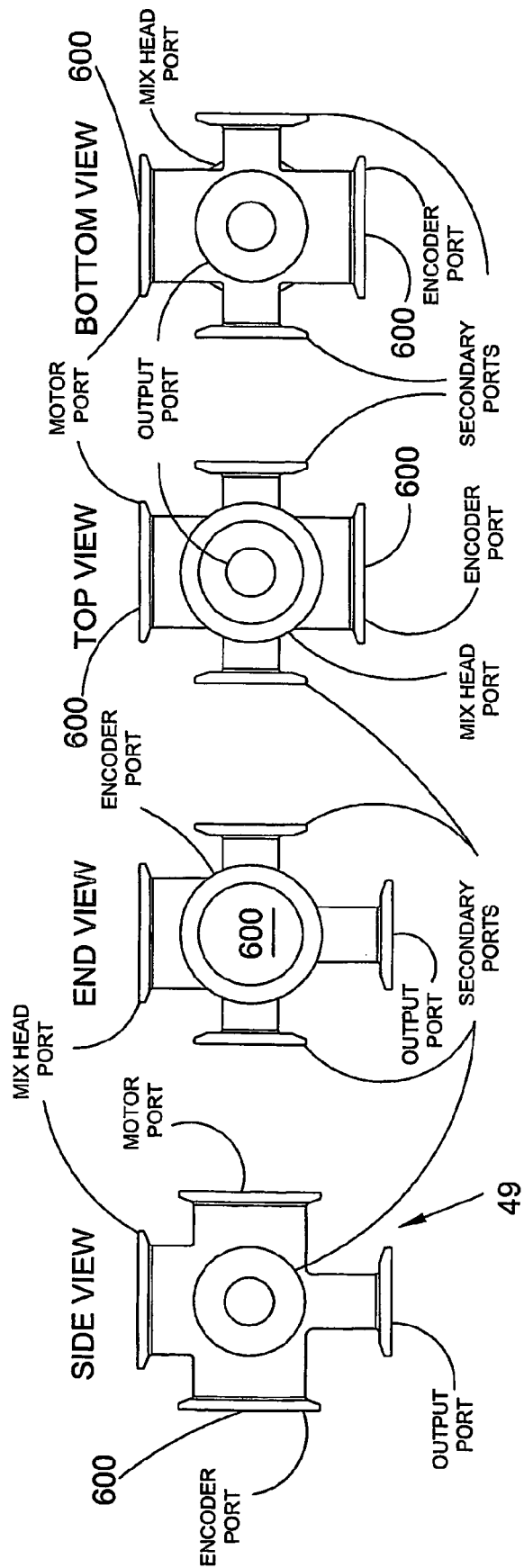

O-RING COMPRESSOR

TOP VIEW

SIDE VIEW

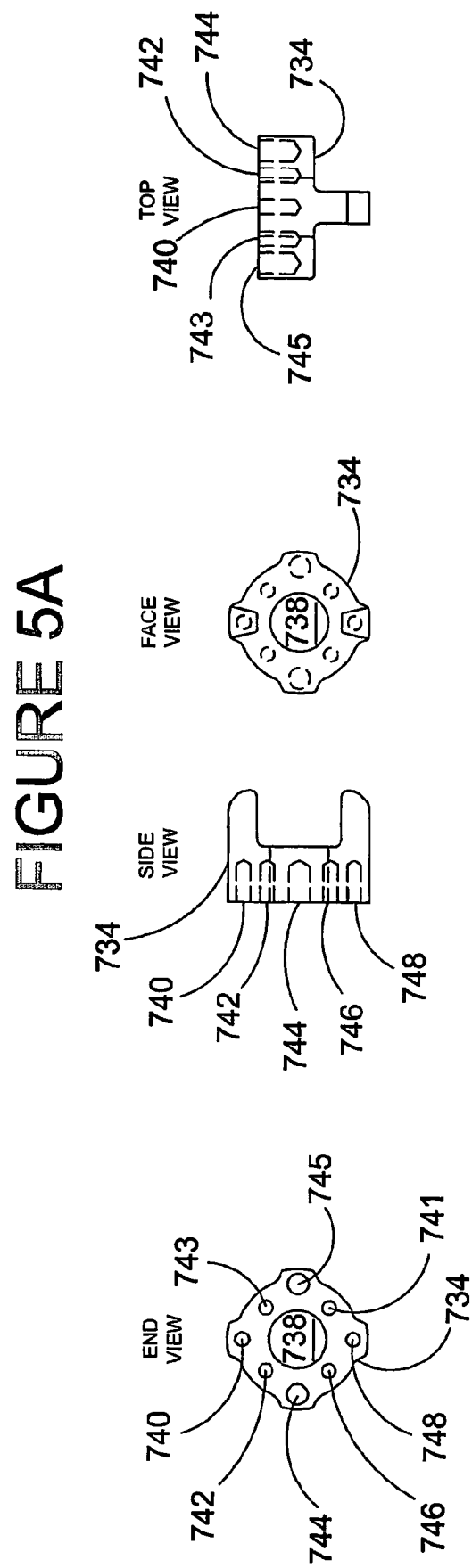

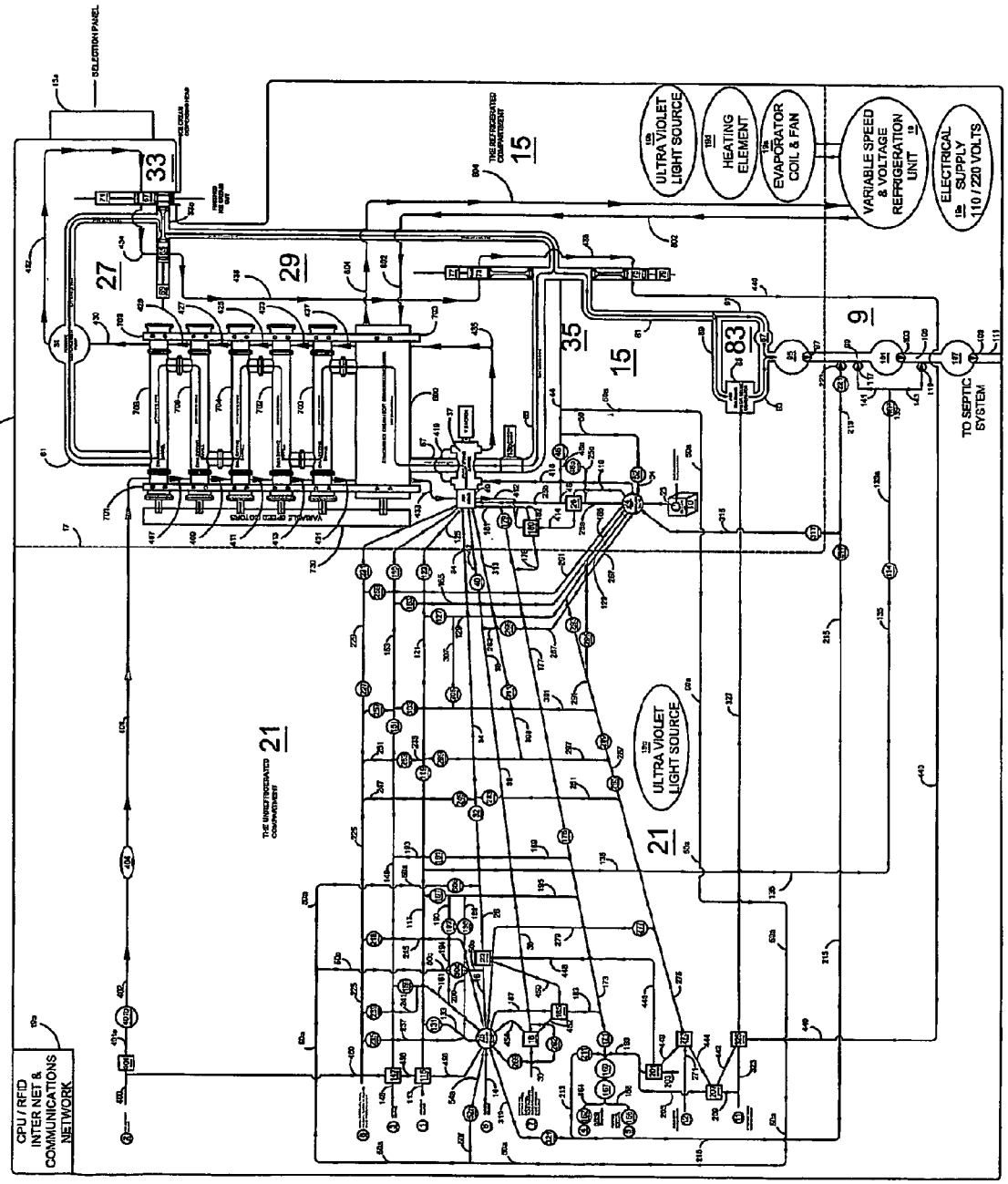

APPARATUS FOR PROCESSING, STORING, AND DISPENSING SOFT SERVE FROZEN FOOD PRODUCT

CROSS REFERENCE TO RELATED APPLICATION

This application is related to provisional application No. 60/462,700 of John Harra, filed Apr. 15, 2003, entitled "APPARATUS FOR MAKING, STORING, AND DISPENSING SOFT ICE CREAM AND ALIKE [sic]." Applicant hereby claims priority of that provisional application. The entire content of that earlier application is hereby incorporated by reference into this application.

TECHNICAL FIELD

This disclosure relates to machines for the manufacture, storage and dispensation of soft serve frozen food compositions.

BACKGROUND

Current machines for producing soft serve frozen food compositions, such as soft serve ice cream and yogurt, comprise a reservoir of liquid soft serve mix connected to a cylindrical freezing barrel. Mix is either gravity fed or pumped to the freezing barrel where the mix is rapidly frozen by means of a high power refrigeration coil surrounding the freezing barrel. Liquid mix is fed into one end of the freezing barrel and out the other end to a dispensing head where the finished product is withdrawn from the machine. A motor rotates a shaft extending through the center of the barrel. A series of scrapers is mounted on the shaft. The mix in the freezing barrel closest to the interior surface of the barrel freezes and the rotating scrapers skim the frozen mix from the surface of the barrel and fold it into the warmer mix in the center of the barrel. At the same time, the mix is propelled longitudinally through the freezing barrel toward the dispensing head.

The problems with such machines are numerous. They use a large amount of electricity. The design does not efficiently utilize space inside the housing of the machine so that only two flavors typically are possible in a reasonably sized machine. The design also does not continuously produce large quantities of uniform consistency soft serve food product. It also takes a considerable period of time to recharge the machine with frozen food product during high demand periods. Furthermore, the machine must be disassembled to clean the parts in contact with food as required by health and regulatory authorities.

SUMMARY

The invention disclosed and claimed herein solves the problems of the current soft serve machines. The soft serve machine uses low power refrigeration equipment. The architecture is such that more than two flavors can be accommodated in a reasonably sized cabinet. The design stores a large quantity of uniform consistency frozen food product that can be continuously dispensed during high demand periods. The machine has a clean-in-place system that permits some or all of the critical parts of the machine in contact with food to be cleaned without having to take the machine apart.

In one embodiment, a soft serve production, storage, and dispensing machine comprises a closed loop circulation system connected to a source of soft serve mix and to a dispensing head. In other embodiments, the soft serve machine comprises a clean-in-place system that permits some or all of the critical food contacting parts of the machine to be cleaned without taking the machine apart.

BRIEF DESCRIPTION OF THE DRAWINGS

FIG. 1A shows the dispensing valve assembly of FIG. 1 in a flow-through position; FIG. 1A also represents the final position of the dispensing valve assembly achieved during a transition from a dispensing position to the flow-through position.

FIG. 1B shows the dispensing valve assembly of FIG. 1 in the dispensing position.

FIG. 1C shows the dispensing valve assembly of FIG. 1 in an intermediate position during a transition from the dispensing position to the flow-through position.

FIG. 1D shows the waste valve assembly of FIG. 1 in the flow-through position.

FIG. 1E shows the waste valve assembly of FIG. 1 in the waste disposal position.

FIG. 1F shows the details of a photovoltaic cell assembly in the anti-bacterial lubrication system of FIG. 1.

FIG. 2C shows the mix sterilizing valve in initial contact with the mix bag valve with a further detail showing a primary o-ring sealed to the bag valve and a secondary o-ring not sealed to the bag valve to permit waste cleaning fluids to be exhausted to the waste disposal system.

FIG. 3B shows side, end, top, and bottom views of a universal six port emulsification barrel.

FIG. 5A shows the arrangement of the whipping bars of FIG. 5 with respect to the axis of rotation of the emulsification barrel of FIG. 5.

FIG. 6 is a schematic diagram of a third embodiment of the invention involving the use of a freezing barrel.

DETAILED DESCRIPTION

The In-Line Emulsification Barrel Embodiment

Figure 1:
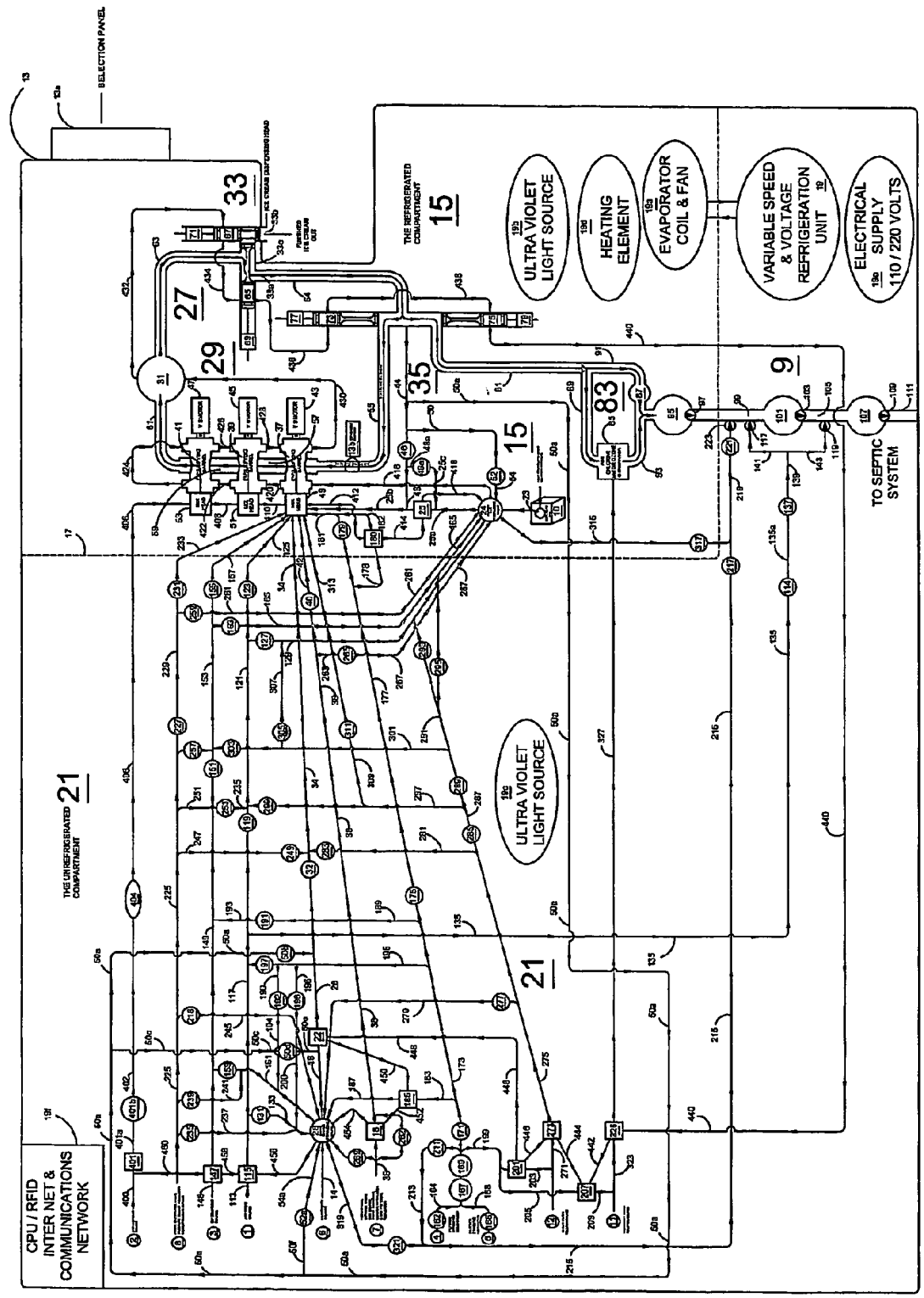
FIG. 1 shows a first example of a soft serve manufacture, storage, and dispensation apparatus in accordance with the invention involving an in-line arrangement of emulsification barrels.

FIG. 1 shows a schematic representation of one embodiment of a soft serve frozen food manufacture, storage, and dispensing apparatus in accordance with the claimed invention. The apparatus of FIG. 1 typically would make, store, and dispense a soft serve frozen dessert product such as soft serve ice cream, yogurt or other similar food product. In addition, the apparatus contains a clean-in-place (CIP) system which permits the cleaning of the machine without dismantling the machine as described in more detail below. In the description below, it is assumed that the apparatus is such a soft serve ice cream or yogurt manufacturing, storage, and dispensing apparatus although the invention is not limited to such applications.

The apparatus of FIG. 1 comprises a cabinet 13 that houses the components of the soft serve apparatus of FIG. 1. The cabinet is made of a rigid material assembled into the form of a rigid box-like structure. The inside and outside surfaces of the cabinet 13 can be made of stainless steel or other suitable material used in the food industry.

There are two main compartments in the cabinet 13. The cabinet includes a refrigerated compartment 15, as defined by the dotted line 17 and an un-refrigerated compartment 21 outside the dotted line 17. The refrigerated compartment 15 contains a supply of soft serve ice cream or yogurt mix and all of the food processing, storage, and dispensing equipment. As described in more detail below, the equipment in the refrigerated compartment 15 comprises a dynamic closed loop processing, storage, and dispensing system for the frozen soft serve dessert product. The compartment also contains an interface to a waste disposal system. A variable voltage and speed refrigeration unit 19 in compartment 21 is connected to an evaporator coil and fan unit 19a inside the compartment 15. The refrigeration unit 19 in compartment 21 and the coil and fan unit 19a in compartment 15 maintain the temperature of the inside of compartment 15 at a controlled temperature suitable for producing a desired frozen dessert composition. The actual temperature to be maintained in compartment 15 can vary depending on the freezing point of the soft serve mix. The freezing point of the mix is determined by the composition of the mix. For example, the sugar content of the mix may determine its freezing temperature. The temperature in the compartment 15 may be maintained at a level just below the freezing point of the soft serve mix being used. This temperature may, for example, be in the range of 0° F. to +26° F. for typical soft serve ice cream or yogurt mixes. The compartment 15 may contain an ultra-violet light source 19b which can be turned on when the compartment 15 is closed to sanitize the interior against any air borne contamination that might have entered the compartment 15. An electrical supply 19e powers the refrigeration unit 19, the motors, the heating elements, the solenoid valves, the pumps, and any other components in the machine requiring electrical power. Although the motors, pumps, solenoid valves, actuators and the like in FIG. 1 are preferred to be electrically actuated, hydraulic or pneumatic versions can be used.

Compartment 21 is not refrigerated and contains a number of systems for supplying and removing a variety of food ingredients and cleaning and sanitization fluids used in the apparatus of FIG. 1. Specifically, the compartment 21 contains an ingredient delivery system for delivering fluids such as food grade gases into the ice cream or yogurt mix to provide a desired overrun in the soft serve frozen dessert product produced by the machine. The ingredient delivery system also includes a system for injecting desired flavorings into the mix. The compartment 21 also includes a system for flushing the apparatus of FIG. 1 with controlled temperature water, CIP fluids, and blow-out gases to provide a way to clean and sanitize the parts of the machine that come in contact with food. These cleaning and sanitization systems are designed in accordance with the requirements of government regulatory and health authorities. The cleaning and sanitizing operations can take place without taking the machine apart thereby reducing the effort and cost of running such a machine. The compartment also contains a system for lubricating the moving parts of the machine in a sanitary manner to meet the requirements of government health and regulatory authorities. Finally, there is a system for removing waste products from the machine. As in the case of the compartment 15, the compartment 21 may also contain an ultra-violet light source 19c for sanitizing the interior of the compartment 21.

Each of the fluid handling systems in the compartment 21 comprises a source of fluid and a piping system for carrying the respective fluids from their sources to various components of the machine. The apparatus of FIG. 1 contains an anti-bacterial fluid source 1, lubrication fluid source 2, CIP solutions source 3, potable domestic cold water supply 4, potable domestic hot water supply 5, flavoring source 6, overrun gas source 7, purge gas source 8, waste fluids drainage system 9, soft serve mix reservoir 10, water salt sugar solution source 11, and a sugar water solution source 12.

The refrigerated compartment 15 contains the equipment that stores, processes, and dispenses soft serve frozen food product. The compartment 15 contains a hermetically sealed reservoir 10 of sanitary unfrozen soft serve mix. A heat source 23 maintains the temperature of the mix in the reservoir 10 at a temperature just sufficient to preserve the mix in a liquid state just above its freezing point. Maintaining the temperature of the mix in the reservoir 10 close to its freezing temperature avoids the necessity of providing a high capacity flash freezing apparatus to quickly freeze the mix once it enters the processing area of the soft serve machine.

The mix in reservoir 10 is withdrawn from the reservoir 10 through a sterile mix valve 24. The soft serve mixture is directed by a positive displacement pump (PDP) 25 toward a dynamic loop processing and storage system 27 through food supply pipes 25a and 25b. A supplemental heating element not shown in FIG. 1 may be wrapped around the lines 25a and 25b from the mix reservoir 10 to the mix head 49. This heating element may be energized to heat the mix in lines 25a and 25b so that it flows more easily to the storage loop 27. As described below, overrun gas and one or more flavorings may also be introduced into the loop processing and storage system 27. The loop storage system 27 has an assembly 29 which emulsifies the soft serve mix, flavoring, and gas to a desired consistency. The storage loop 27 also contains a positive displacement pump 31 for circulating the soft serve food product around the storage loop 27, a dispensing head valve assembly 33 for delivering the finished soft serve frozen dessert product out of the machine, and a waste disposal valve assembly 35 for removing waste materials from the storage loop 27. The storage loop 27 comprises interconnecting piping that connects the emulsification assembly 29, the pump 31, the dispensing head valve assembly 33, and waste disposal valve assembly 35 in series to form a closed loop flow path in which soft serve frozen food product is continuously circulated by the pump 31 during normal operation of the machine of FIG. 1.

Positioning valves in the dispensing head valve assembly 33 to outflow positions diverts soft serve frozen food product from the storage loop 27 into a serving container for consumption outside the machine. Once the desired amount of soft serve food product has been dispensed, the valves in the assembly 33 are returned to a flow through closed position to circulate frozen food product in the loop 27. As the food product is removed from the storage loop 27 at the dispensing head valve assembly 33, it is replaced in the storage loop 27 by simultaneously introducing more soft serve mix, gas, and flavoring from their respective sources into the loop 27 so that the loop 27 remains full of circulating soft serve product. The machine is controlled from a selection panel 13a near the dispensing head.

In this example, the emulsification assembly 29 comprises three series connected in-line emulsification barrels 37, 39, and 41. Although this example of the invention has an emulsification assembly 29 having three in-line emulsification barrels, any number of such emulsification barrels may be used to make up an emulsification assembly 29 in the storage loop 27 depending on the desired characteristics of the finished soft serve food product. Each of the emulsification barrels 37, 39, and 41 comprises a generally cylindrical chamber containing a number of rotating whipping elements driven by variable speed motors 43, 45, and 47. The whipping elements are driven at a speed that results in a frozen food product of desired consistency. New soft serve product from reservoir 10 and pump 25, and new flavoring and overrun gas, is admitted to each of the emulsification barrels 37, 39, and 41 by means of a respective mix head 49, 51, or 53. FIG. 1 and its associated description shows food ingredients and cleaning and sanitizing fluids being introduced into the storage loop 27 only through mix head 49 in the storage loop 27. The same or different food ingredients and cleaning and sanitizing fluids may also be introduced into one or more of the other mix heads 51 and 53 depending on the desired characteristics of the soft serve food product and the particular cleaning and sanitizing procedures employed.

As alluded to above, in addition to mix from the reservoir 10, one or more of the mix heads 49, 51, and 53 admit overrun producing gas and flavoring into respective emulsification barrels 37, 39, and 41.

Overrun producing gas is supplied to the mix heads from a regulated high pressure gas source 7 connected to one input of a pump 18 by means of a supply line 36. The pump 18 directs a variable predetermined volume of the gas at a pre-selected pressure to mix head 49 through line 38, solenoid valve 40, and line 42. A pressure sensor may be installed in the overrun gas lines to the mix heads to provide feedback to a pressure controller that operates the pump 18 to thereby regulate the pressure and volume of overrun gas supplied to the mix heads. The gas can be any food grade gas that is acceptable for use in providing overrun in a frozen soft serve food product. Nitrous oxide is an example of such a gas suitable for this application.

Flavoring is introduced into the mix heads from a flavoring source 6. Flavoring from source 6 flows into a flavor sterilizing valve 28 from supply line 14 and is directed by a pump 22 to the mix head 49 through lines 16, 26, and 34 connected in series with a solenoid valve 32. Any flavoring may be introduced into the soft serve mix such as vanilla, chocolate, or strawberry flavoring.

The mix heads 49, 51, and 53 admit soft serve food product, gas, and flavoring into respective emulsification barrels 37, 39, and 41 through respective inlet ports in the side walls of the respective emulsification barrels 37, 39 and 41. Pipe 55 is connected to an input port of the emulsification barrel 37. Pipe 57 connects an output port of the emulsification barrel 37 to an input port of the emulsification barrel 39. Pipe 59 connects an output port of the emulsification barrel 39 to an input port of the emulsification barrel 41. An output port of the emulsification barrel 41 is connected to a pipe 61 which is connected to the input of pump 31. A pipe 63 connects the output of pump 31 to the input of the dispensing head valve assembly 33. The valve assembly 33 selectively connects the input port of the valve assembly 33 to one of two output ports, a flow through circulation port 33a and a dispensing port 33b. The dispensing port 33b outputs finished servings of frozen food product. The circulation port 33a is connected to a pipe 64 that connects the valve assembly 33 to the input of the waste disposal valve assembly 35.

The dispensing head valve assembly 33 comprises a valve 65 and a valve 67. The valve 65 is bi-directionally driven by a linear actuator 69 and valve 67 is bi-directionally driven by a linear actuator 71. The dispensing head valve assembly 33 can selectively direct the soft serve product around the closed loop storage system 27 or outside the machine. When the pistons in the valves 65 and 67 are in a flow-through position, as shown in FIG. 1A, the contents of the closed loop storage system 27 is continuously circulated around the loop by the pump 31. When the pistons in the valves 65 and 67 are in a dispensing position, as shown in FIG. 1B, finished frozen food product is dispensed from the machine of FIG. 1. FIG. 1C shows the dispensing head valve assembly 33 in an intermediate position during a transition from the dispensing position of FIG. 1B to the flow-through position of FIG. 1A. In FIG. 1B, the valve 65 is pushed to the left and valve 67 is pushed up. When the dispensation of soft serve product is completed, the valve 65 is first pushed to the right to the position shown in FIG. 1C. This pushes residual soft serve product out of the right hand end of the passage 33c through which the valve 65 slides. The valve 67 then is pushed downwardly to push residual soft serve product out of the dispensing port 33b. The valve assembly now is in the FIG. 1A flow through position.

The waste disposal valve assembly 35 comprises a valve 73 and a valve 75. Valve 73 is bi-directionally driven by a linear actuator 77 and valve 75 is bi-directionally driven by a linear actuator 79. The waste disposal valve assembly 35 selectively directs the contents of the closed loop storage system 27 around the loop or to the waste disposal system 9 via a waste pipe 81. When pistons in the valves 73 and 75 are in a flow-through position, as shown in FIG. 1D, the contents of the closed loop storage system are circulated around the loop. When the pistons 73 and 75 are in a waste disposal position as shown in FIG. 1E, the contents of the loop storage system are drained through waste line 81 to a sanitary flush loop 83 comprising chlorinator/ozonator 85 and a pump 87. Pipes 89, 91, and 93 connect the chlorinator/ozonator 85 and pump 87 in a loop. The pump 87 circulates liquid containing the chlorine and/or ozone produced by the chlorinator/ozonator 85 around the loop to thereby sanitize the effluent from the loop storage system 27. The sanitary flush loop 83 also acts as a barrier to bacteria and other contaminants that might enter the apparatus of FIG. 1 from an outside waste disposal system or septic system. The output of the sanitary flush loop 83 is connected to the input of a waste line solenoid valve 95, the output of which exits the solenoid valve 95 by way of a one way valve 97. An anti-bacterial trap 99 connects the output of the one way valve 97 to the input of a waste line solenoid valve 101, the output of which is connected to the input of a one way valve 103. An anti-bacterial trap 105 connects the output of the one way valve 103 to another waste line solenoid valve 107, the output of which is connected to the input of a one way valve 109. The output of the one way valve 109 is connected to a waste pipe 111 connected to a private septic system or municipal waste disposal system. The seals in the waste solenoid valves 95, 101, and 107 and the one way nature of the valves 97, 103, and 109 provide a triply redundant mechanism of preventing bacteria and other contaminants from entering the apparatus of FIG. 1 from the septic system.

Anti-bacterial fluid source 1 supplies anti-bacterial fluid to various components of the machine of FIG. 1 through various pipes and conduits. Any anti-bacterial fluid acceptable for use in the food processing industry, for example, iodine, may be used. The anti-bacterial fluid sanitizes all the components in FIG. 1 that come in contact with food. In addition, anti-bacterial fluid 1 sanitizes components in the waste disposal system 9 so that pathogens and other contaminants cannot enter the machine from outside waste disposal systems connected to the machine. The anti-bacterial system (ABS) comprises a source of anti-bacterial fluid 1 connected to a supply line 113. Supply line 113 is connected to the input of a pump 115 which delivers anti-bacterial fluid at a desired pressure to the components of the machine needing sanitization. The anti-bacterial fluid can be any fluid capable of killing bacteria used by the food industry, for example, an iodine solution.

Anti-bacterial fluid is pumped from source 1 by pump 115 to the loop storage system 27 by way of line 113, pump 115, line 117, solenoid valve 119, line 121, solenoid valve 123, and line 125. Anti-bacterial fluid from source 1 is also pumped to the mix sterilizing valve 24 by way of a solenoid valve 127 connected to line 121 and a line 129 connected between the output of the solenoid valve 127 and the input of the mix sterilizing valve 24. Finally, anti-bacterial fluid from source 1 may be pumped to the flavor sterilizing valve 28 by way of a solenoid valve 131 connected to line 117 and a line 133 connected between the output of the solenoid valve 131 and the input of the flavor sterilizing valve 28.

In addition to the components of the food processing, storage, and dispensing systems in the machine of FIG. 1, the anti-bacterial fluid is supplied from pump 115 to the traps 99 and 105 through lines 117, 135, and 135a, solenoid valve 137, lines 139, 141, and 143, and one way valves 117 and 119, as shown in FIG. 1. Anti-bacterial fluid in the traps 99 and 105 kills any bacteria that may enter the machine from the external waste disposal system. A pressure sensor 114 may be installed in the anti-bacterial system lines, for example in line 135, to monitor the system for pressure drops that may indicate possible contamination of critical parts of the machine.

The soft serve machine in accordance with this example of the invention shown in FIG. 1 provides an ability to periodically empty the machine of unwanted frozen food product and thoroughly clean and sanitize the passages through which food flows without having to take the machine apart and without adverse impact on subsequent food processing and dispensation.

The machine of FIG. 1 is connected to a source 3 of one or more CIP solutions. The CIP solutions may be Benefit brand Phosphate-Free with Chlorinated Cleaner or Demand brand Low-Foaming Anionic Acid Sanitizer both from Diversey-Lever. Hydrogen peroxide may be provided by a dedicated fluid supply to clean the faces of the mix and flavor bags. The CIP solutions are pumped to various parts of the machine during CIP procedures to clean and sanitize the passages of the machine in contact with food. In this example of the invention, CIP fluids 3 are directed to one or more of the mix heads in the dynamic storage loop 27, the mix sterilizing valve 24, and the flavor sterilizing valve 28

The clean-in-place system comprises a source 3 of CIP solution connected to a supply line 146. The supply line 146 is connected to the input of a pump 147. The output of the pump 147 is connected to line 149 which is connected to the input of a solenoid valve 151. The output of the valve 151 is connected to a line 153 which is connected to another solenoid valve 155. A line 157 connects the output of the solenoid valve 155 to the input of the mix head 49. A solenoid valve 159 connects line 149 to a line 161 which is also connected to the flavor sterilizing valve 28. A solenoid valve 163 connects line 153 to line 165 which is also connected to the input of the mix sterilizing valve 24.

The apparatus of FIG. 1 is connected to source 4 of domestic filtered cold water connected in series with a solenoid valve 162 and a supply line 164. The apparatus of FIG. 1 is also connected to a source 5 of domestic filtered hot water connected in series with a solenoid valve 166 and a supply line 168. The water from the hot and cold water supplies 4 and 5 may be sanitized in an ultra-violet light sanitizer 167 in series with the water sources. A temperature sensor 169 measures the temperature of the water coming from the hot and cold water supplies 4 and 5. Cold water from the cold water supply 4 and hot water from the hot water supply 5 are supplied to the storage loop 27 through the following series connection. The output of the temperature sensor is connected in series with a solenoid valve 171. The output of solenoid valve 171 is connected to one end of a line 173. The other end of line 173 is connected to the input of a solenoid valve 175. The output of solenoid valve 175 is connected to one end of a line 177. The other end of line 177 is connected to the input of another solenoid valve 179. A line 181 connects the output of solenoid valve 179 to an input of the mix head 49. Solenoid valves 171, 175, and 179 are used to direct a full pressure flush of water into the mix valve 49 and the storage loop 27 to remove food from the storage loop during one stage of cleaning operations. In other stages of cleaning operations, a more measured amount of water is needed. In those situations, water from line 177 is metered into the mix head 49 and the storage loop 27 by way of a series connection of line 178, pump 180, and line 182 connecting line 177 to the mix head 49. Water is metered into a sugar water system, described in more detail below, by way of a series connection of line 199, pump 201, and line 203 connected between the water sources 4 and 5 and a sugar water supply line. Water is also metered into a sugar salt water system, described in more detail below, by way of a series connection of a line 205, a pump 207, and a line 209. Water from the supplies 4 and 5 may be run into the waste disposal system by way of solenoid valve 211, lines 213 and 215, solenoid valve 217, line 219, solenoid valve 221, and one way valve 223 connected between the water supplies 4 and 5 and the trap 99 in the waste disposal system 9. Running water into the waste disposal system 9 is done when it is desired to use the hottest or coldest water deliverable by the water supplies 4 and 5. Initially, water from those supplies typically is not at the desired temperature and running water from those supplies for a time will cause the temperature to reach the desired temperature as indicated by the temperature sensor 169. Once the water temperature reaches the desired temperature, it may be directed to other components in the apparatus instead of the waste disposal system 9.

Hot and/or cold water may be metered into the flavor sterilizing valve 28 through line 183, pump 185, and line 187 connected in series between line 173 and an input of the flavor sterilizing valve 28. Hot and/or cold water may be introduced into the CIP system by way of a series connection of line 189, solenoid valve 191, and line 193 connected between lines 149 and 173. Hot and/or cold water may also be introduced into line 161 in the CIP system by way of a series connection of line 190, solenoid valve 192, and line 194 connected between lines 161 and 195. Hot and/or cold water also may be introduced into the anti-bacterial system through line 195 and solenoid valve 197 connected in series between line 117 and 173. Hot and/or cold water may also be introduced into line 133 in the anti-bacterial system by way of a series connection of line 196, solenoid valve 198, and line 200 connected between lines 133 and 195.

The machine of FIG. 1 contains a system for supplying purge gas to the various fluid flow passages in the machine. High pressure food grade gas such nitrogen is blown through these passages during the cleaning cycle to remove various residual fluids from the system. In this example of the invention, purge gas is used to remove residual food, water, cleaning solutions, and sanitizing solutions from areas that will be, or could possibly be, in contact with food in subsequent food processing operations undertaken by the machine. A regulated source 8 of high pressure food grade gas such as nitrogen is connected to one end of a supply line 225. High pressure gas admitted to the line 225 flows to the mix head 49 through a series connection comprising solenoid valve 227, line 229, solenoid valve 231, and line 233. High pressure gas is applied to line 133 in the anti-bacterial system through a solenoid valve 235 and line 237 connected in series between line 225 and the line 133. High pressure purge gas is applied to line 161 in the CIP system through a solenoid valve 239 connected in series with line 241 between line 225 and line 161. High pressure purge gas is directed to the flavor sterilizing valve 28 by way of a series connected solenoid valve 218 and line 245 between line 225 and the flavor sterilizing valve 28. The same high pressure purge gas is applied to line 121 in the anti-bacterial system through the series connection of line 251, solenoid valve 253, and line 235 connected between lines 121 and 225. The purge gas flows through this series connection, and then into line 121, solenoid valve 123, line 125, and mix head 49. Purge gas is also applied to line 153 in the CIP system by way of a solenoid valve 257 connected between lines 153 and 225. The purge gas flows from the solenoid valve 257 into line 153, solenoid valve 155, line 157, and mix head 49. Purge gas can be directed to the mix sterilizing valve 24 by way of solenoid valve 259 and line 261, as shown in FIG. 1.

The food grade gas from source 7 may be used as an additional purge gas source for the mix sterilization valve 24, the storage loop 27, and the flavor sterilizing valve 28. Purge gas from source 7 may be directed to the mix sterilization valve 24 through bypass solenoid valve 262, line 38, line 263, solenoid valve 265, and line 267. Purge gas from source 7 may be directed to mix head 49 in the storage loop 27 via bypass solenoid valve 262, line 38, solenoid valve 40, and line 42. Purge gas from source 7 may be directed to the flavor sterilizing valve 28 through a solenoid valve 269 connecting line 36 to the input of the flavor sterilizing valve 28.

The apparatus of FIG. 1 includes a sugar water supply useful in cleaning operations. Use of sugar water as a final flush of the systems after cleaning and sanitizing operations will result in a more palatable frozen food product once food production resumes. This system comprises a supply 12 of sugar water solution connected to one end of a supply line 271. The concentration of sugar in the sugar water solution may be cut by the introduction of a measured amount of water into supply line 271 from the hot and/or cold water supplies 4 and 5 via pump 201 through line 203. The other end of the supply line 271 is connected to the input of a pump 273. Pump 273 directs sugar water solution into line 275 which delivers it to several components of the machine that have been subjected to cleaning and sanitization procedures. Specifically, the series connected solenoid valve 277 and line 279 connect the line 275 to the flavor sterilizing valve 28. The series connected line 281 and solenoid valve 283 connect sugar water line 275 to line 34 in the flavor delivery system. Sugar water is supplied to line 129 in the anti-bacterial system by way of a solenoid valve 285, line 287, solenoid valve 289, line 291, and solenoid valve 293 to line 129 and then to the mix sterilization valve 24. Sugar water is supplied to line 165 in the CIP system by way of a solenoid valve 295 connecting line 291 to line 165 and then to the mix sterilization valve 24. Line 287 is connected to a line 297 which is connected in series with a solenoid valve 299 to thereby deliver sugar water to line 121 in the anti-bacterial system and then to solenoid valve 123, line 125, and mix head 49. Line 291 is connected to line 301 in series with a solenoid valve 303 to thereby deliver sugar water to line 153 in the CIP system and then to solenoid valve 155, line 157, and mix head 49. Solenoid valve 305 and line 307 deliver sugar water to line 129 in the anti-bacterial system and then to mix sterilization valve 24. Sugar water is supplied to the storage loop 27 by way of a line 309 connected to line 297 which is connected to the input of a solenoid valve 311. Line 313 connects the output of the solenoid valve 311 to the input of mix head 49 which is the entrance for sugar water into the entire storage loop 27. Sugar water that has been delivered to the various lines in the anti-bacterial and CIP systems described above eventually finds its way to the mix sterilizing valve 24 and the flavor sterilizing valve 28 and flushes those components as well.

Cleaning and sanitizing fluids delivered to the mix sterilizing valve 24 are drained from the valve 24 and sent to the waste disposal system 9 via line 315, solenoid valve 317, line 219, solenoid valve 221, and one-way valve 223. Similarly, cleaning and sanitizing fluids are exhausted to the waste disposal system 9 from the flavor sterilizing valve 28 by way of line 319, solenoid valve 321, line 215, solenoid valve 217, line 219, solenoid valve 221, and one-way valve 223.

The apparatus of FIG. 1 also includes a system for supplying a salt and sugar water solution to the chlorinator/ozonator 85 in the waste disposal system 9. The salt water part of the combination provides the chlorine and oxygen ions that are used by the chlorinator/ozonator 85 to perform its sanitization function. The sugar component of the solution provides anti-freeze protection. The salt and sugar water solution comes from a supply 11 connected to a supply line 323 connected to the input of a pump 325. Water from the one or both of the domestic water supplies 4 and 5 may be used to cut the salt and sugar concentrations in the solution from the source 11. Such diluting water is introduced into supply line 323 from pump 207 and line 209. Pump 325 directs the salt and sugar solution into line 327 and then into the chlorinator/ozonator 85.

Part or all of the fluids circulating in the storage loop 27 during various phases of cleaning operations may also be directed to the mix sterilizing valve 24 and the lines 25a and 25b to clean those places as well. This is accomplished through a series connection of a line 44, a solenoid valve 46, and a line 48 connecting pipe 64 to line 25b and a line 48a, a solenoid valve 46a and a line 25c connecting line 48 to line 25a. A series connection of line 50, solenoid valve 52, and line 54 connects line 44 to the mix sterilization valve 24. Similarly, part or all of the fluids circulating in the storage loop 27 during various phases of cleaning operations may also be directed to the flavor sterilizing valve 28 and the lines 16 and 26 on either side of the flavor pump 22 to clean those places as well. This is accomplished through a series connection of a line 44, a line 50a, and a solenoid valve 50b connected between pipe 64 and line 26. Line 50c, solenoid valve 50d, and line 50e connect line 50a to line 16. A series connection of line 50a, line 50f, solenoid valve 52a, and line 54a connects line 44 to the flavor sterilization valve 28.

It is not critical how many emulsification barrels are used in the storage loop 27 or how many of the mix heads receive food ingredients or cleaning fluids, or sanitizing fluids. FIG. 1 shows three emulsification barrels in the storage loop 27. Different numbers of emulsification barrels may be used in specific situations to achieve desired consistency of the finished product. Although FIG. 1 shows that food ingredients and cleaning and sanitizing fluids are directed to only one of the mix heads, the same or different ingredients and fluids may be directed to one or both of the other mix heads in FIG. 1.

Anti-bacterial food grade lubricant is supplied from a lubricant source 2. The lubricant is introduced from source 2 into a closed loop flow path that connects in series all the components of FIG. 1 needing lubricant. The anti-bacterial lubricant may be any approved anti-bacterial lubricant used in food processing machinery such as mineral oil containing ethanol and iodine. The lubricant lubricates various bearing surfaces in the moving parts of the apparatus of FIG. 1. Lubricant is withdrawn from source 2 into a supply line 400 by a positive displacement pump 401. Pump 401 circulates anti-bacterial lubricant in the closed loop lubrication system. All of the pumps in FIG. 1 receive anti-bacterial lubricant. The mix heads 49, 51, and 53, the emulsification barrels 37, 39, and 41, the valves 65, 67, 73, and 75 in the storage loop 27 all receive anti-bacterial lubricant. The mix sterilizing valve 24 and flavor sterilizing valve 28 also receive anti-bacterial lubricant.

The lubricant loop comprises pump 401, line 401a, pressure sensor 401b, line 402, photovoltaic cell assembly 404, line 406, mix head 53, line 408, mix head 51, line 410, mix head 49, line 412, pump 180, line 414, pump 25, line 416, mix sterilizing valve 24, line 418, one side of emulsifying barrel 37, line 420, one side of emulsifying barrel 39, line 422, one side of emulsifying barrel 41, line 424, a second side of emulsifying barrel 41, line 426, a second side of emulsifying barrel 39, line 428, a second side of emulsifying barrel 37, line 430, pump 31, line 432, valve 67, line 434, valve 65, line 436, valve 73, line 438, valve 75, line 440, pump 325, line 442, pump 207, line 444, pump 273, line 446, pump 201, line 448, pump 22, line 450, pump 185, line 452, pump 18, line 454, flavor sterilizing valve 28, line 456, pump 115, line 458, pump 147, and line 460 connected to line 400, thereby closing the loop.

The photovoltaic cell assembly 404 in the anti-bacterial lubricant loop is shown in detail in FIG. 1F. A photovoltaic cell 404a is responsive to a light source 439 that directs a light beam 441 through the lubricant in the lubricant lines 402 and 406. Any contamination in the lubricant can be detected by a change in the output of the photovoltaic cell 404a, as measured by a meter 443 connected to the photovoltaic cell 404a. Lubricant from line 402 is directed to a chamber 447 in housing 445. A light source 439 is mounted in a light transmissive plastic end piece 449 and directs light through the chamber 441 and the lubricant contained therein to the photovoltaic cell 404a mounted to another light transmissive end piece 451. An example of contamination detectable with the apparatus of FIG. 1F would be the leakage of soft serve food product from food handling portions of the machine of FIG. 1 into the lubrication system. Normally, the food handling portions of the machine are completely sealed from the lubrication system so that there can be no mixing of food with lubricant. If a seal between the two systems were to be compromised, however, food might leak into the lubricant and reduce its lubricating properties. Leakage of food into the lubricant will change the opacity of the lubricant and will be picked up by the output of the photovoltaic cell 404a. An alarm can be sounded and repairs effected when this happens.

The pressure sensor 401b is used to detect pressure drops in the lubrication system indicating the presence of leaks in the system that need to be fixed.

It should be pointed out that all of the parts of a machine in accordance with this invention can be assembled with sanitary fittings acceptable for use in the food industry.

All the elements of the machine of FIG. 1 are controlled by a computer 19f. The computer 19f controls the operation of the various solenoid valves, pumps, and motors in the food processing system and the cleaning and sanitizing systems so that the machine performs desired functions at desired times. It also controls the refrigeration system and the heating elements that control the temperature in various parts of the machine. The computer 19f also controls the ultra-violet light sources and the chlorination and ozonation systems. The computer 19f responds to commands entered through the selection panel 13a and to sensory information generated by the various sensors in FIG. 1. The computer detects and processes information gleaned from RFID tags that may be attached to the various mix, flavoring, and cleaning fluid sources. The computer 19f may be connected to the Internet or other communication network whereby the machine can be remotely monitored or controlled.

Food Production, Processing, and Storage Cycle

At the beginning of the food production, processing, and storage operations of the apparatus of FIG. 1, soft serve mix is pumped from mix reservoir 10 into the storage loop 27 along with desired amounts of flavoring from source 6 and nitrous oxide gas from source 7 until the loop 27 is completely full. The refrigeration unit freezes the mixture when it travels out of the reservoir 10 and into the equipment located in the refrigerated compartment 15. The mixture is emulsified in the emulsification barrels 37, 39, and 41 and continuously circulated around the storage loop 27 by pump 31. The dispensing head valve assembly and waste valve assembly 35 are both in their flow-through positions completing a closed loop flow path for the mix in the storage loop 27. Soft serve frozen food product from the dispensing head may be obtained from the machine by moving the valves in the dispensing head assembly 33 to the dispensing position. A predetermined amount of soft serve food product is withdrawn from the storage loop 27. Then the valves in the valve assembly 33 are returned to their flow through position to stop the dispensation of soft serve food product. As the soft serve food product is dispensed from the loop 27, the dispensed food product is simultaneously replaced with new mix from reservoir 10, new flavor from source 6, and more overrun gas from source 7.

Cleaning and Sanitization Cycles

At predetermined times, the apparatus of FIG. 1 must be cleaned and sanitized. This process begins by turning off the refrigeration unit 19 and letting the formerly refrigerated compartment 15 warm up. A heating element 19d may be provided in the compartment that can be used to help raise the temperature in the compartment 15 to melt the frozen food in the storage loop 27 and supply lines to the loop 27. Hot water from source 5 is run into the waste disposal system until the temperature of the supplied water reaches maximum temperature, such as 120° F. to 130° F. The waste disposal valve assembly 35 is moved to the waste disposal position to open the loop 27 to the waste disposal system 9. The hot water from source 5 then is directed to the storage loop 27 to flush the food product in the loop 27 into the waste disposal system. During this flushing operation, the emulsification elements in the emulsification barrels are rotated to break up the frozen food product in the loop 27. The temperature of the water promotes melting of the food to facilitate its flow to the waste disposal system 9. A supplementary heating element 13b can be located close to the loop 27 to further raise the temperature of the liquids in the storage loop 27 during flush operations. Such elevated temperature may be 150° F. or more depending on the nature of the cleaning solutions involved. The waste valve assembly 35 alternates between its flow through and waste disposal positions to alternately circulate hot water through the loop 27 and drain the water and food product into the waste disposal system 9.

After the hot water flush has removed as much of the food from the loop 27 as is practical, CIP chemicals are injected into the volume of liquid in the storage loop 27 until a desired ratio of CIP chemical to water is achieved. Preferably, the CIP chemicals are introduced gradually into the mix head 49 so that the circulation of liquid in the storage loop 27 produces a uniform CIP concentration throughout the loop 27. The CIP chemicals are selected to break up the fats and proteins in the frozen food product being cleaned from the system. The valves in the valve assemblies 33 and 35 are fluttered to clean out their respective piston rings and the interior surfaces of their respective valve cylinders during CIP and flushing procedures.

Once the CIP solutions have been circulated in the storage loop for a period of time sufficient to remove as much of the food product as is required, they are dumped into the waste disposal system 9 and a second hot water flush of the system may be performed. A second CIP procedure may then be performed followed by a third hot water flush. The valve assemblies 33 and 35 are fluttered as before to expose the insides of valves to the cleaning fluids and flush water.

Next, high pressure nitrogen purge gas may be blown through the cleaned areas of the machine to blow out the water in the system. After the purge operation, a sanitizing agent such as an iodine solution is pumped to the storage loop 27 and circulated for a time sufficient to kill any possible bacterial or other microbial contamination that might have entered the system. Again the valve assemblies 33 and 35 are fluttered to expose the insides of the valves in those assemblies to sanitizing fluid. The sanitizing fluid then is drained from the system and followed by an ozonated water wash and a subsequent nitrogen purge.

Any iodine residue can be removed by flushing the system with sugar water from source 12. Then the system can be filled with high pressure nitrous oxide gas from source 7. The sweet taste of the nitrous oxide gas will improve the flavor of the frozen food product made after the cleaning process. The storage loop 27 then can be refilled with mix, overrun gas, and flavor and returned to making, storing, and dispensing frozen food product.

The cleaning and sanitizing procedures described here are illustrative. The actual nature and sequence of the cleaning and sanitization procedures will be dictated by government health authorities. The machine of FIG. 1 can be adapted to follow those mandated procedures.

The Mix Reservoir and Mix Sterilization Valve

Figure 2:
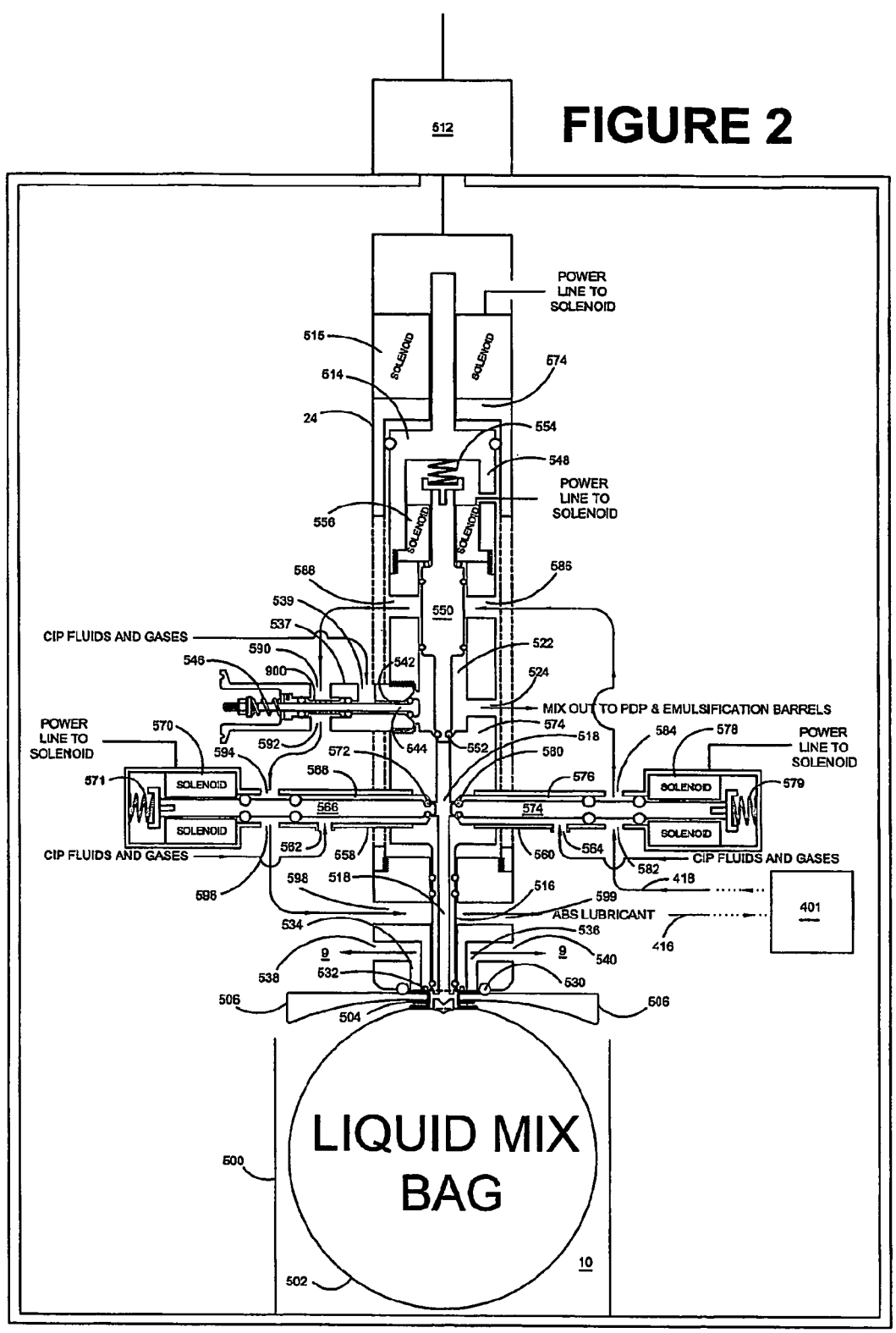
FIG. 2 shows a detailed schematic diagram of the mix sterilization valve in FIG. 1.
Figure 2A:
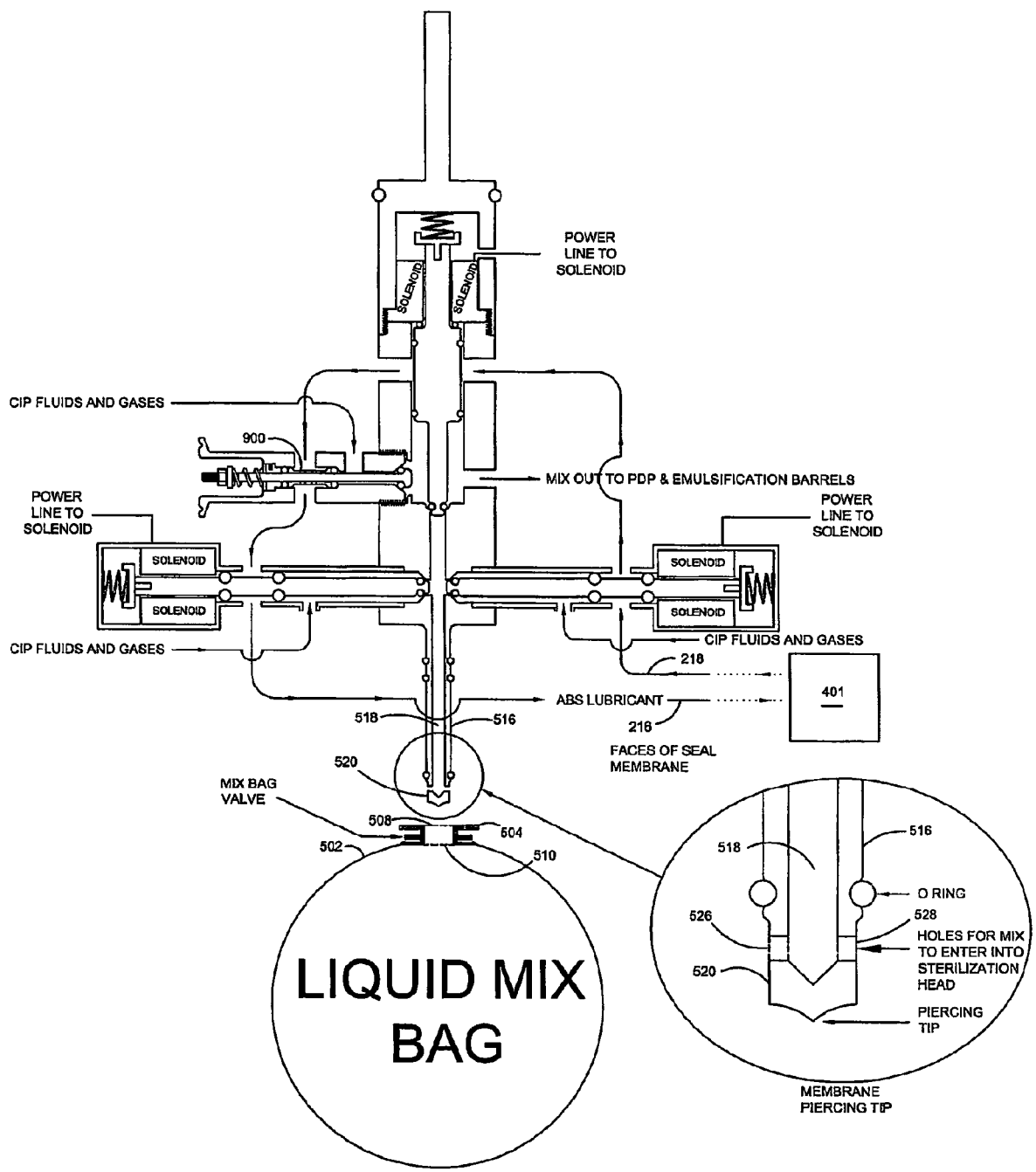
FIG. 2A shows the piercing piston of FIG. 2 with further details of the piercing piston tip and mix bag.

FIG. 2 shows a detailed schematic diagram of the mix reservoir 10 and the mix sterilization valve 24. FIG. 2A shows the piercing piston and some details of the piercing piston tip and bag valve shown in FIG. 2. The mix reservoir 10 comprises a box 500 containing a sealed plastic bag 502 filled with a, preferably sterile, soft serve mix. The mix is withdrawn from the bag 502 through a mix bag valve 504. The bag valve 504 is structured so as to permit the bag 502 to hang from a slot formed in a shelf 506 fixed to the housing of the soft serve machine. The mix bag valve 504 is an annular structure bonded to the circumference of a circular opening in the bag 502. The valve 504 comprises a pair of annular discs spaced apart by a cylindrical separator. The space between the discs admits the edge of the slot in the shelf 506. A cylindrical passage through the bag valve 504 communicates with the opening in the bag 502 to provide a passage for the extraction of mix from the bag 502. Upper and lower membranes 508 and 510 double seal the opening in the bag 502 and the cylindrical passage through the bag valve 504. The mix bag 502 is installed into the machine by inserting the edges of the slot in the shelf into the space between the annular discs of the bag valve 504 and sliding the bag valve along the slot until the bag 502 is in place under the mix sterilizing valve 24.

The mix sterilizing valve 24 is a cylindrical tube driven toward and away from the shelf 506 by a linear actuator 512 connected to one end of the mix sterilizing valve 24. The mix sterilizing valve 24 contains a piercing piston 514 connected to a linear actuator 515 which moves the piston 514 longitudinally within the valve 24. The linear actuator 515 alternately thrusts the piercing piston out of the mix sterilizing valve 24 into the bag 502 and retracts the piston 514 into the mix sterilizing valve 24.

The piston 514 comprises a narrow suction tube 516 at the mix bag end of the valve 24 which is inserted into the mix bag 502 to withdraw mix from the bag to deliver it to the rest of the processing equipment. The suction tube 516 contains a passage 518 through which mix from the bag 502 flows. The suction tube 516 in the piston 514 also comprises a piercing tip 520 at the mix bag end of the suction tube 516. When the linear actuator 516 pushes the piston 514 downwardly toward the mix bag 502, the piercing tip 520 breaks the membranes 508 and 510 and is inserted into the liquid mix in bag 502. The distal end of the passage 518 in the suction tube 516 is connected to a chamber 522. A mix output port 524 is connected to the chamber 522. When mix is being drawn from the bag 502 by the pump 25, mix enters the passage 518 in the suction tube 516 through orifices 526 and 528 in the suction tube 516. The mix is drawn upwardly through the passage 518 into the chamber 522 and out of the valve 24 through the mix output port 524.

Figure 2B:
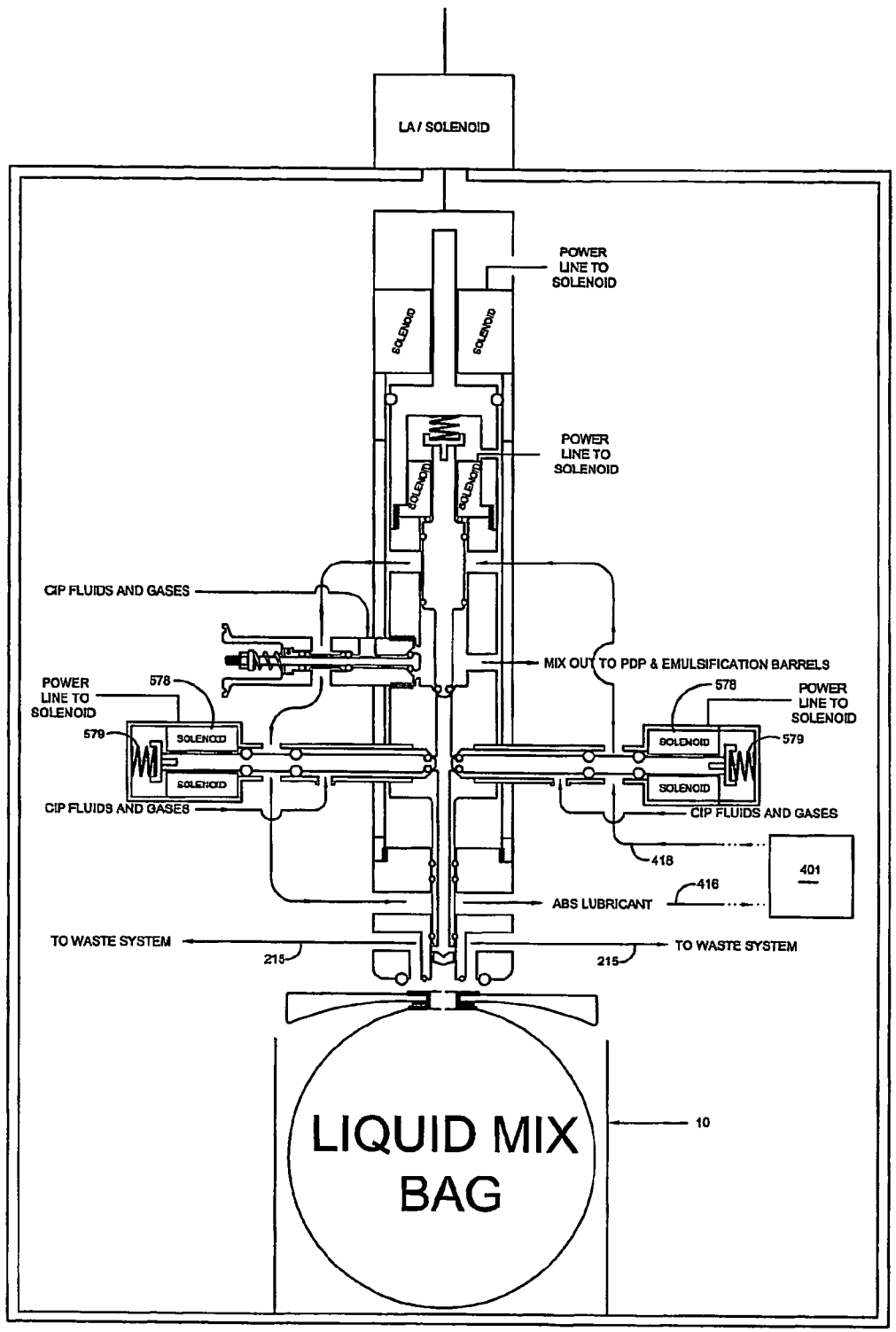
FIG. 2B shows the mix sterilizing valve of FIG. 2 fully retracted from the mix bag with the piercing piston fully retracted into the mix sterilizing valve.
Figure 2D:
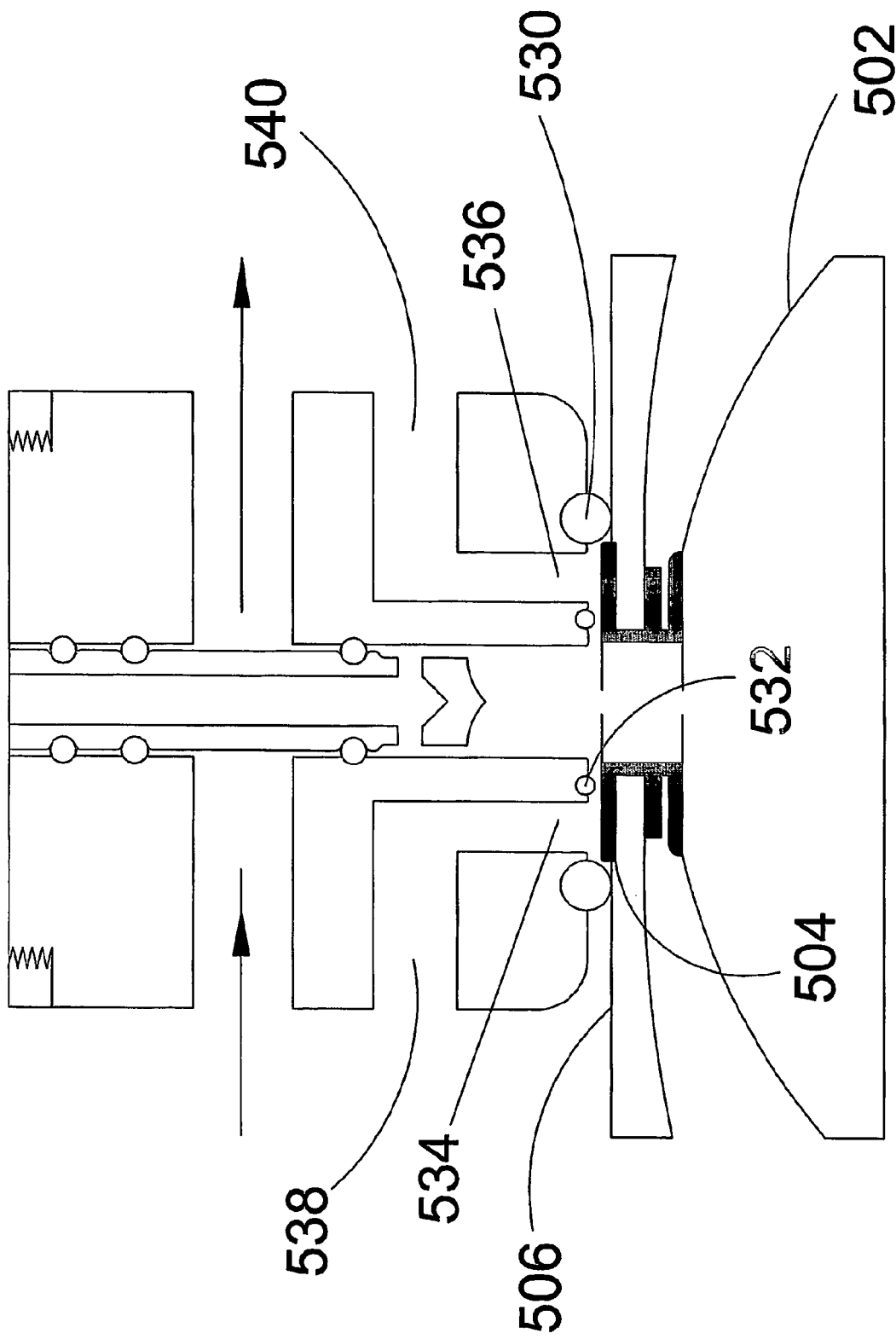
FIG. 2D is magnified view of the o-ring area in FIG. 2C showing more clearly the initial seal of the primary o-ring to the bag valve with a space between the secondary o-ring and bag valve which permits waste cleaning fluids to be exhausted to the waste disposal system.
Figure 2E:
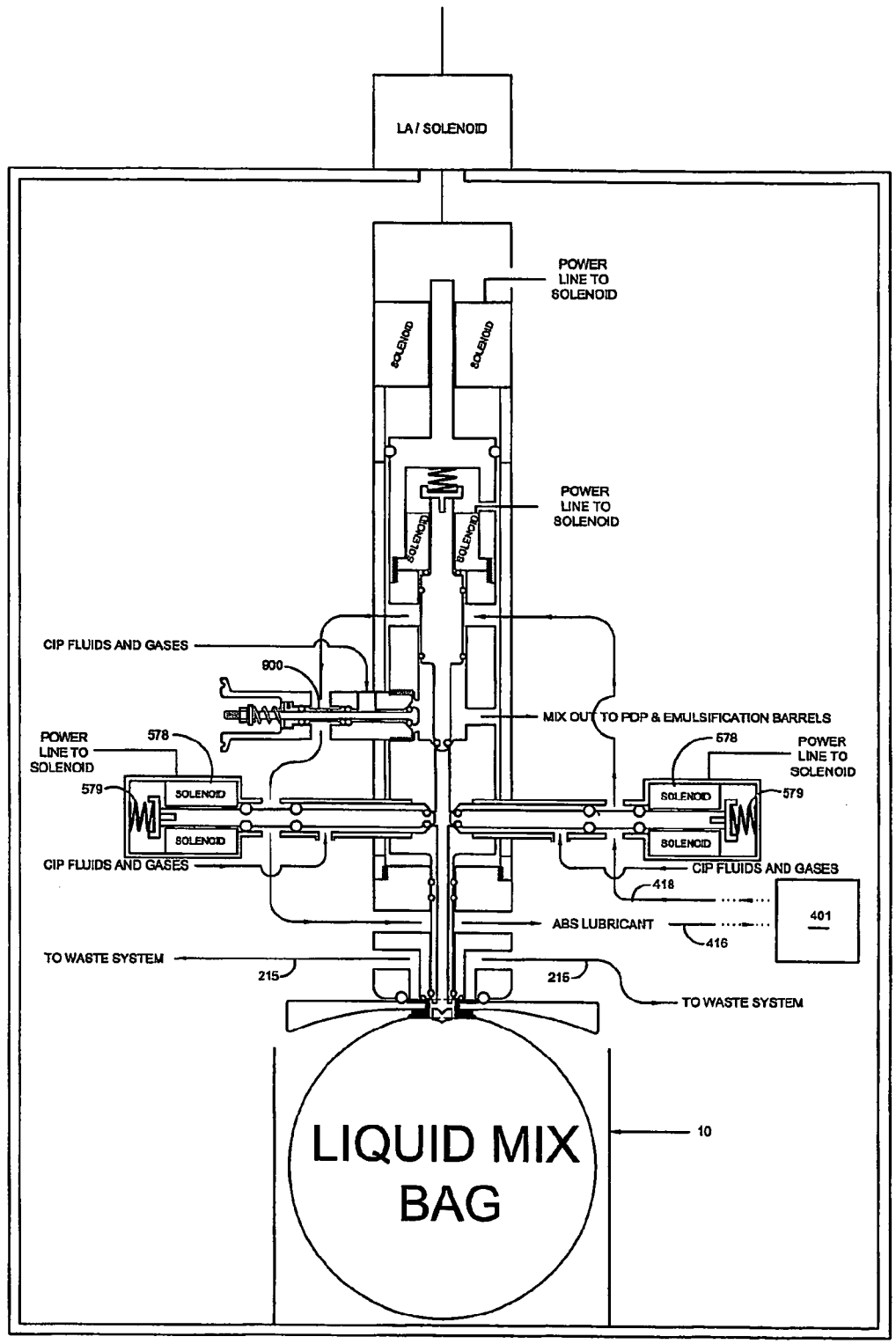
FIG. 2E shows the mix sterilization valve fully engaged with the mix bag; both o-rings are sealed to the bag valve and the piercing piston has pierced the seals on the mix bag.

The bag end of the mix sterilizing valve 24 comprises an outer o-ring 530 and an inner o-ring 532 with two waste disposal passages 534 and 536 between the o-rings 530 and 532. The passages 534 and 536 communicate with waste disposal ports 538 and 540 connected to the waste disposal system 9. When a new mix bag is to be installed on the shelf 506, the mix sterilization bag is retracted from the shelf and the piercing piston is retracted into the mix sterilization valve 24, as shown in FIG. 2B. Once the new mix bag 502 has been installed, the mix sterilization valve 24 is lowered toward the shelf 506. As the mix sterilization valve 24 is lowered toward the shelf 506 by the actuator 512, the o-ring 530 first contacts the shelf 506 and the outer edge of the bag valve 504 to provide an initial seal between the bag end of the mix sterilization valve 24 and the shelf 506. See FIGS. 2C and 2D. This initial seal prevents fluid from leaking out of the mix bag 502 or the passage 518. At this point, the inner seal 532 has not contacted the shelf 506 resulting in a space between the seal 532 and the shelf 506 which permits fluid to flow from the passage 518 to the waste disposal passages 534 and 536. See FIGS. 2C and 2D. Further movement of the mix sterilization valve 24 toward the shelf compresses the o-ring 532 against the shelf 506 which seals the passage 518 from the waste disposal passages 534 and 536. See FIG. 2E.

The piercing piston 514 in the mix sterilization valve 24 includes a spring loaded valve 537 which opens to admit cleaning fluids from an input port 539 into the chamber 522 in the piston 514. When valve 537 is closed, it prevents leakage of mix from chamber 522 into the clean-in-place system and it prevents cleaning fluids from contaminating mix in the chamber 522. Valve 537 comprises a cylindrical passage 542 connecting the input port 539 to the chamber 522. The passage 542 contains a valve stem 544. One end of the valve stem 544 extends into the chamber 522 and has an o-ring which seals the chamber from the passage 542 when the valve stem 544 is in its left most position in FIG. 2. Spring 546 biases the valve stem 544 leftward to close the passage off from the chamber 522. Pressurized cleaning fluid applied to the input port 539 during cleaning operations will overcome the force applied by spring 546 and open the valve 537 so that cleaning fluid will be admitted to the chamber 522.

The piston 514 also comprises a valve 548 that controls fluid flow between the passage 518 and the chamber 522. The valve 548 comprises a valve stem 550 extending into the chamber 522. An o-ring at the lower end of the valve stem 550 closes off the passage 518 from the chamber 522 when the valve stem is in its lower most position in FIG. 2. A spring 554 biases the valve stem 550 downwardly in FIG. 2 so that the chamber 522 is closed off from the passage 518. A solenoid 556 may be powered to force the valve stem 550 upwardly to open the passage 518 to the chamber 522.

The piston 514 also contains a pair of valves 558 and 560 that control the admission of cleaning fluids into the passage 518 from input ports 562 and 564, respectively. The valve 558 comprises a valve stem 566 that slides within a cylindrical passage 568 connecting input port 562 to the passage 518. A solenoid 570 slides the valve stem 566 in the passage 568 to open and close the valve 558. An o-ring 572 in one end of the valve stem 566 seals the passage 518 from the passage 568 when the valve stem 566 is in its left most position and valve 558 is closed. Spring 571 pushes the valve stem 566 to the right in FIG. 2 to bias the valve 558 closed. The valve 560 comprises a valve stem 574 that slides within a cylindrical passage 576 connecting input port 564 to the passage 518. A solenoid 578 slides the valve stem 574 in the passage 576 to open and close the valve 560. An o-ring 580 in one end of the valve stem 574 seals the passage 518 from the passage 576 when the valve stem 574 is in its left most position and valve 560 is closed. Spring 579 pushes the valve stem to the left in FIG. 2 to bias the valve 560 closed. When valves 558 and 560 are open, cleaning fluids, such as CIP solutions, sanitizing solutions, water, sugar water, and purge gases may enter the passage 518 and flow down to the piercing tip 520 and out the orifices 526 and 528 to clean the outer surfaces of the membrane 508 that seals a new mix bag 502 that has been slid into position under the mix sterilization valve 24.

When a new sealed mix bag 502 containing sanitary soft serve mix is installed on the shelf 506, the mix sterilization valve 24 seals the outer edge of the bag valve 504 to the lower end of the mix sterilization valve 24, cleans and sanitizes food flow passage 518 and piercing tip 520, cleans and sanitizes the exterior surface of the bag valve 504 and the membrane seal 508, and provides a path to drain cleaning and sanitizing fluids to the waste disposal system 9. When cleaning procedures have been completed, the linear actuator 512 further presses the mix sterilization valve 24 against the shelf 506 to seal the inner o-ring 532 against the bag valve 504. This seals off the passages to the waste disposal system 9. The linear actuator 514 then pushes the piercing piston downwardly toward the mix bag. The tip of the piercing piston 520 pierces the membrane seals 508 and 510 in the bag valve 504 and the suction tube 516 is thrust into the mix in the bag 502. This provides a path for the pump 25 to withdraw mix from the bag 502 and pump it to the storage loop 27. See FIG. 2E.

The lubrication system lubricates all of the moving parts in the valves in FIG. 2. The lubricant pump 401 directs lubricant to an input port 582 in the valve 560 (through intermediate equipment shown in FIG. 1, but not in FIG. 2, as represented by the dotted part of the pump output line in FIG. 2). Lubricant is exhausted from lubricant exhaust port 584 in valve 560. The lubricant exhausted from port 584 is directed to lubricant input port 586 in valve 548. Lubricant is exhausted from lubricant output port 588 in valve 548. The lubricant exhausted from port 588 is directed to lubricant input port 590 in valve 537. Lubricant is exhausted from lubricant output port 592 in valve 537. The lubricant exhausted from port 592 is directed to lubricant input port 594 in valve 558. Lubricant is exhausted from lubricant output port 596 in valve 558. The lubricant exhausted from port 596 is directed to lubricant input port 598 in the mix sterilization valve 24. Lubricant is exhausted from lubricant output port 599 in the mix sterilization valve 24 and returned to the input of pump 401 (through intermediate equipment shown in FIG. 1, but not in FIG. 2, as represented by the dotted line in the input line to pump 401 in FIG. 2).

The Emulsification Barrel and Mix Head Assembly

Figure 3:
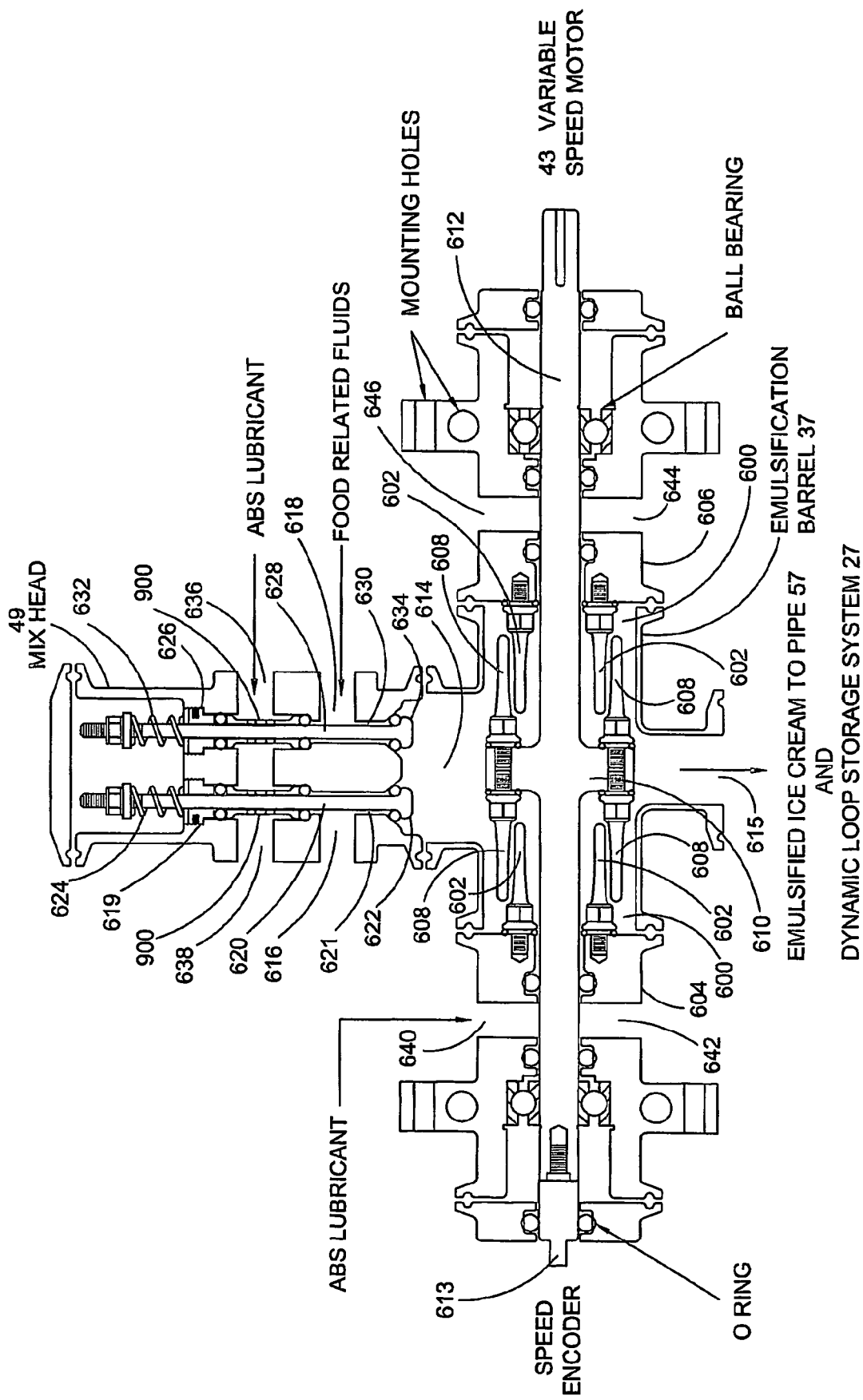
FIG. 3 is a detailed schematic diagram of one of the emulsification barrels shown in FIG. 1.

FIG. 3 is a detailed schematic diagram of emulsification barrel 37, mix head 49, and variable speed motor 43 shown generally in FIG. 1. The other emulsification barrels, mix heads, and motors in example of the invention shown in FIG. 1 are the same.

The emulsification barrel 37 is a cylindrical structure that has a generally cylindrical mixing chamber 600 where the mix, overrun gas, and flavor are emulsified into a high quality, uniform consistency, soft serve frozen food product. This is achieved by the action of a series of whipping fingers or bars located in the chamber 600. The whipping fingers comprise a set of stationary whipping fingers 602 fastened to the end walls 604 and 606 of the emulsification barrel 37. The fingers 602 are spaced from the longitudinal axis of the chamber 600 and extend longitudinally into the chamber 600. Rotatable whipping fingers 608 are fastened to a flange 610 formed on a drive shaft 612 extending along the longitudinal axis of the chamber 600 and driven by variable speed motor 43. An encoder 613 connected to the drive shaft 612 may be used in an arrangement that controls the speed of the motor. Although the encoder 613 is shown as a component separate from the motor in this embodiment of the invention, it may also be integral with the motor in other embodiments. Fingers 608 are spaced in a radial direction from the longitudinal axis of the chamber 600 and extend longitudinally within chamber 600. Rotatable fingers 608 are radially spaced from stationary fingers 602 so that the fingers 608 slide past fingers 602 to create a shearing action in the mix in the chamber 600 when the fingers 608 are rotated by the drive shaft 612. Emulsified soft serve food product is forced out of the emulsification barrel 37 at a cylindrical and radially extending output port 615 and delivered to next element in the storage loop 27.

The mix head 49 is a generally cylindrical structure attached to a circular input port 614 extending in a radial direction into the emulsification barrel 37. The mix head 49 may have a plurality of cylindrical input ports extending in a radial direction into the mix head 49. Two illustrative input ports 616 and 618 are shown in FIG. 3. Each input port is associated with a spring biased valve that controls the admission of fluid presented to the input port to the mixing chamber 600 in the emulsification barrel 37. Input port 616 communicates with a valve 619 comprising a valve stem 620 extending through a passage 621 connecting input port 616 with input port 614 and chamber 600 in the emulsification barrel 37. The spring 624 biases the valve stem 620 upwardly so that seal 622 at the lower end of the valve stem 620 closes off the passage 621 from the input port 614. Similarly, input port 618 communicates with a valve 626 comprising a valve stem 628 extending through a passage 630 connecting input port 618 with input port 614 and chamber 600 in the emulsification barrel 37. The spring 632 biases the valve stem 628 upwardly so that seal 634 at the lower end of the valve stem 628 closes off the passage 630 from the input port 614. Fluid pressure of a sufficient magnitude applied to the input ports of the mix head 49 will overcome the force applied by the springs and open the valves to admit the fluids into the chamber 600 where those fluids are emulsified by the rotating whipping fingers 608 passing through the mix and past the stationary fingers 602.

Anti-bacterial lubricant is pumped into the structure of FIG. 3 at lubricant input port 636 and proceeds to lubricant output port 638, lubricant input port 640, lubricant output port 642, lubricant input port 644, and lubricant output port 646.

Figure 3A:
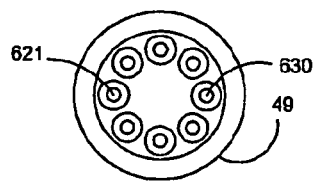
FIG. 3A shows various details of the mix head in FIG. 3.
Figure 3A:
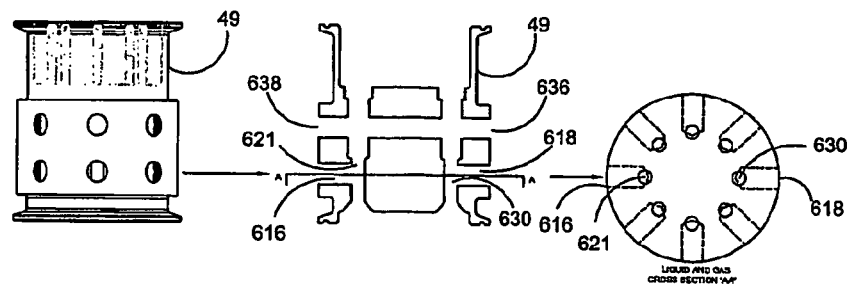
Figure 3A:
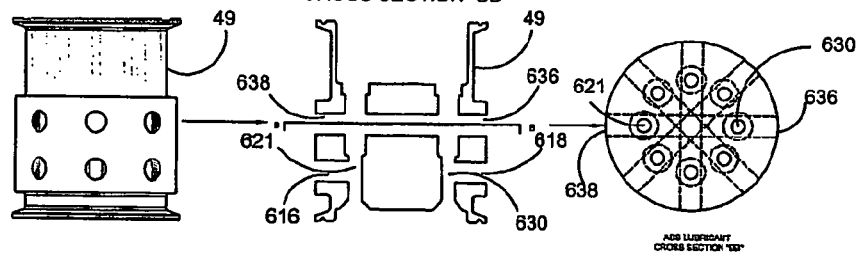
Figure 3A:
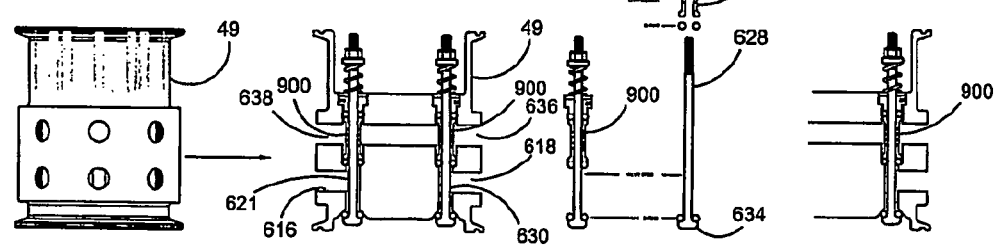
Figure 3A:
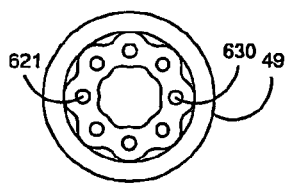

FIG. 3A shows top and bottom views of the mix head 49 showing the passages 621 and 630 shown in FIG. 3. Additional passages like passages 621 and 630, along with respective valves like valves 619 and 626, are located around the periphery of the mix head 49. These additional passages and valves may be used to admit additional food ingredients or cleaning fluids into the mix head 49 and its associated emulsification barrel 37. FIG. 3A also shows a sectional view "AA" illustrating the passages that carry food ingredients or cleaning fluids into the mix head 49 and a sectional view "BB" illustrating the passages that carry lubrication. FIG. 3A also shows the parts making up one of the valves that admit food or cleaning fluid into the mix valve 49.

FIG. 3B shows side, end, top, and bottom views of a six port emulsification barrel that may be used as a specific implementation of emulsification barrels 49, 51, and 53 in FIGS. 1 and 3. The emulsification barrel of FIG. 3B comprises a cylindrical chamber 600 having six input ports, including a mix head input port, an output port, a motor port, and an encoder port like those shown in FIG. 3. In addition, the emulsification barrel of FIG. 3B has two secondary input ports that can be used for introducing additional ingredients into the emulsification barrel. Those secondary input ports can also be used to attach sensors to the emulsification barrel.

The O-Ring Compressor

Figure 3C:
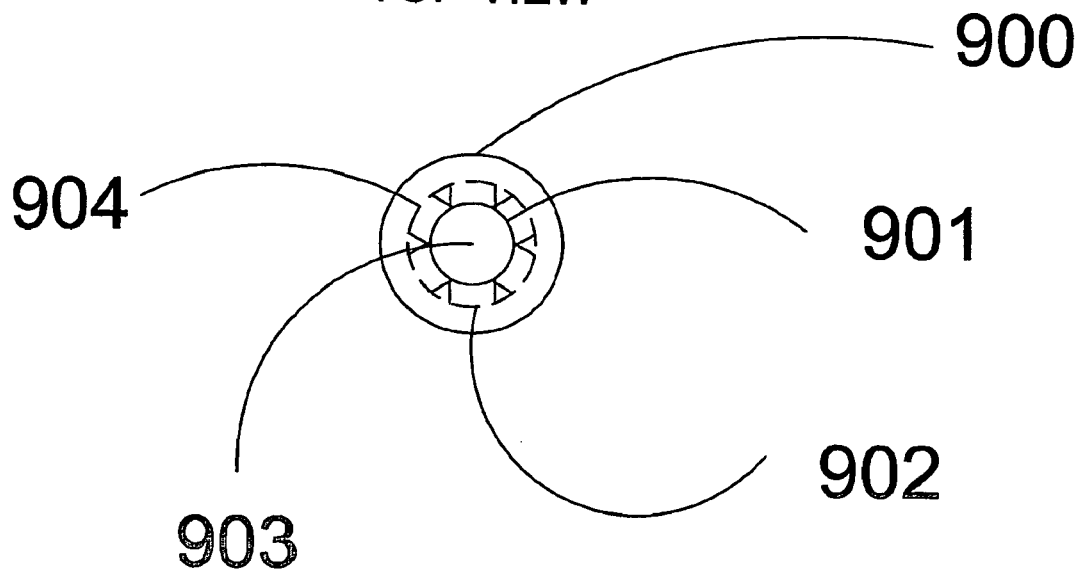
FIG. 3C shows a top and a side view of the o-ring compressors shown in some of the valves in FIGS. 2, 2A, 2B, 2C, 2E, 3, and 3A.
Figure 3C:
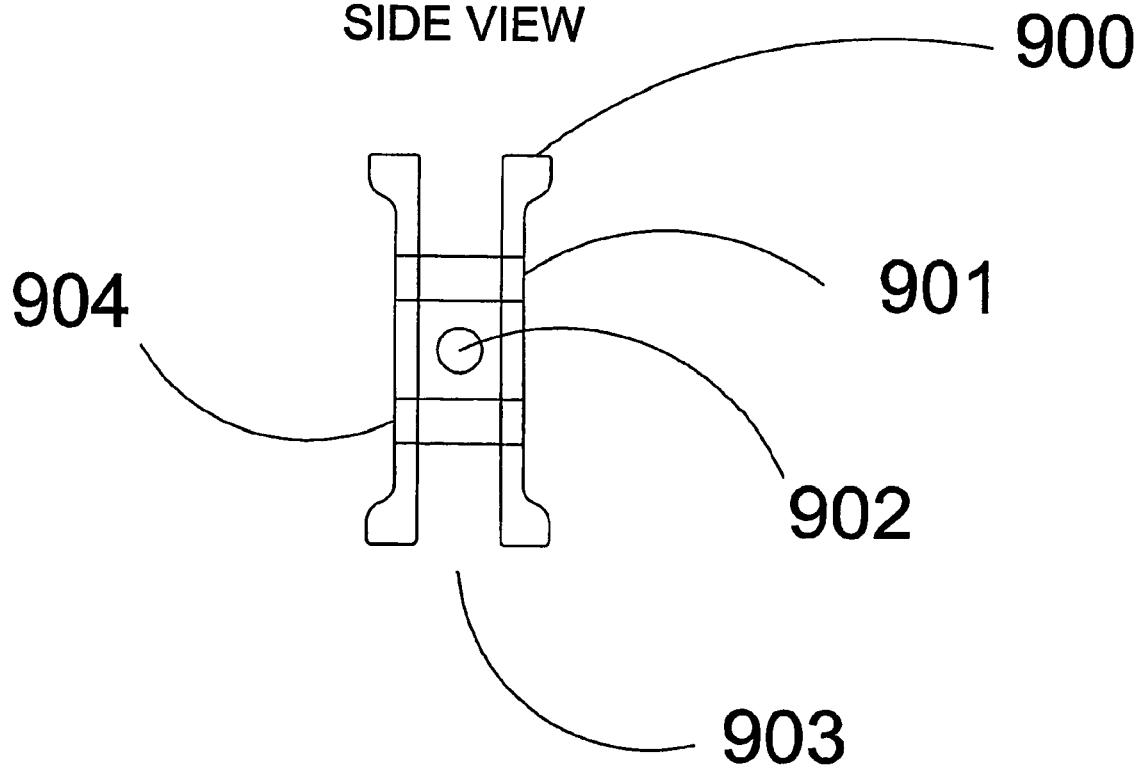

FIG. 3C illustrates the details of an o-ring compressor 900 used in valve 537 shown in FIGS. 2, 2A, 2B, 2C, and 2E and the valves in the mix head structure shown in FIGS. 3 and 3A, such as valves 619 and 626. The o-ring compressor 900 is a spacer located between two axially displaced o-ring seals in these valves that provides even pressure against the o-rings to create an impervious barrier to the leakage of fluids between the lubricant passages and the food carrying passages in the soft serve machine. The o-ring compressor 900 is a thimble-shaped cylindrical structure having cylindrical lubricant flow passages 901, 902, and 904 extending diametrically through the sides of the o-ring compressor 900. This arrangement permits lubricant to flow easily through the valve in which the o-ring compressor is located and the o-rings at both ends of the o-ring compressor 900 prevent leakage of lubricant into the food and leakage of food into the lubricant. The o-ring compressor 900 also contains a longitudinally extending passage 903 through which the stem of the valve containing the compressor 900 extends.

The Serpentine Emulsion Barrel Embodiment

Figure 4:
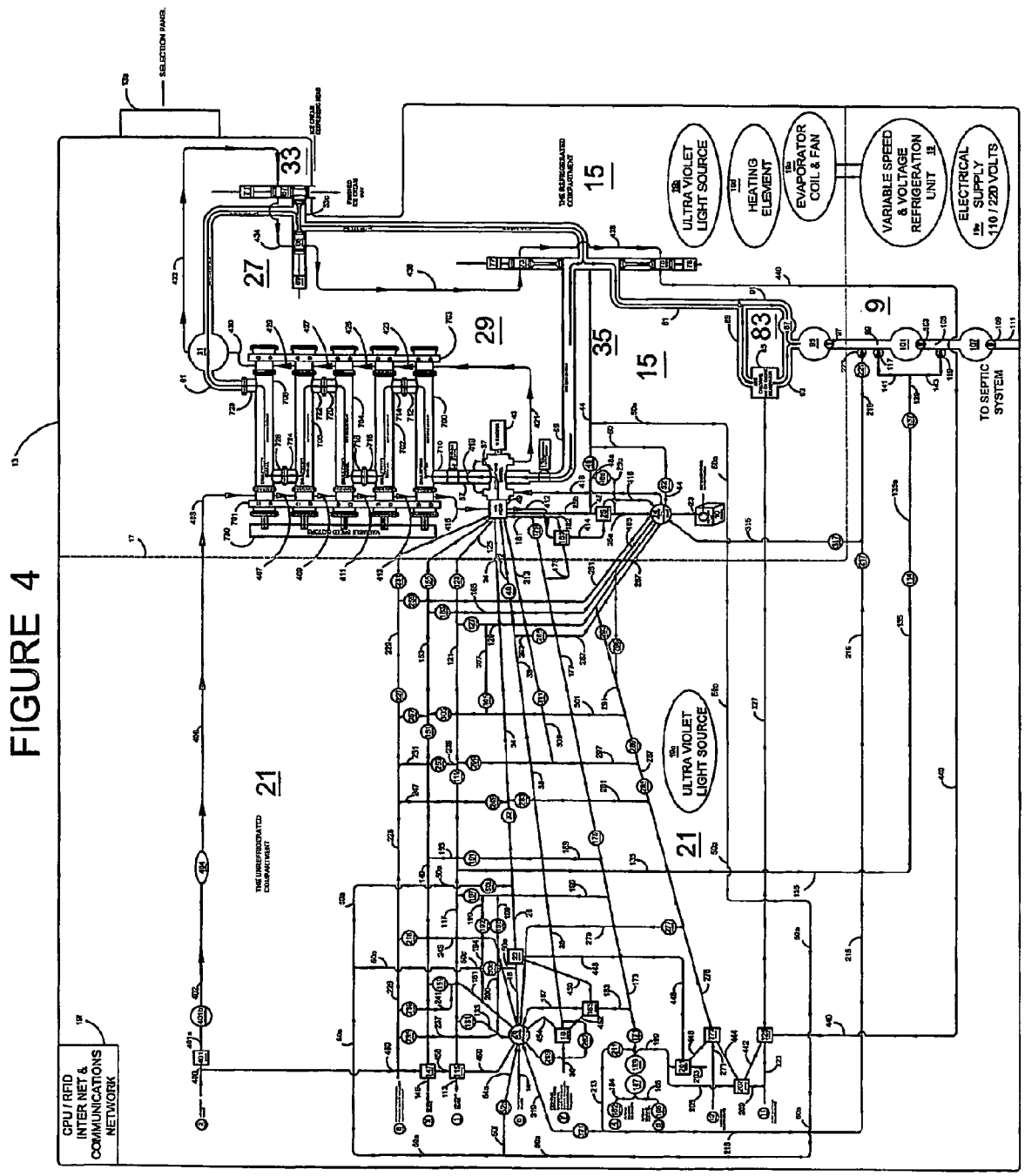
FIG. 4 is a schematic diagram of a second embodiment of the invention involving a serpentine arrangement of emulsification barrels.

FIG. 4 shows an arrangement of elongated cylindrical emulsification barrels 700, 702, 704, 706, and 708 fixed to support frames 701 and 703 and connected in series. These emulsification barrels 700, 702, 704, 706, and 708 can be substituted for the emulsification barrels 39 and 41 in FIG. 1. Cylindrical mixing chambers and longitudinally displaced and radially directed input ports and output ports of the emulsification barrels 700, 702, 704, 706, and 708 define a serpentine flow path for the mix circulating in the storage loop 27. Specifically, pipe 57 from emulsification barrel 37 is connected to an input port 710 of the emulsification barrel 700. An output port 712 of the emulsification barrel 700 is connected to an input port 714 of the emulsification barrel 702. An output port 716 of the emulsification barrel 702 is connected to an input port 718 of emulsification barrel 704. An output port 720 of the emulsification barrel 704 is connected to an input port 722 of emulsification barrel 706. An output port 724 of the emulsification barrel 706 is connected to an input port 726 of emulsification barrel 708. An output port 728 of emulsification barrel 708 is connected to pipe 61 which is connected to the input of the pump 31.

The bearings in the serpentine barrel assembly are lubricated with anti-bacterial lubricant by the lubrication system. Lubricant is directed by pump 401 to line 401a, pressure sensor 401b, line 402, photovoltaic sensor assembly 404, and line 406 which is connected to one end of the emulsification barrel 708. Lubricant flows from barrel 708 through line 407 to barrel 706 then to line 409 and barrel 704. Lubricant flow continues through line 411, barrel 702, line 413, barrel 700, line 415, mix head 49, line 412, pump 180, line 414, pump 25, line 416, mix sterilization valve 24, line 418, one side of emulsification barrel 37, line 419, the other side of emulsification barrel 37, and line 421 to the other side of the emulsification barrels 700, 702, 704, 706, and 708. Lubricant flows from line 421 into one side of barrel 700 and then to line 423, barrel 702, line 425, barrel 704, line 427, barrel 706, line 429, barrel 708, and line 430. Lubricant continues on in line 430 to pump 31. The rest of the lubrication system is the same as the one shown in FIG. 1.

Figure 5:
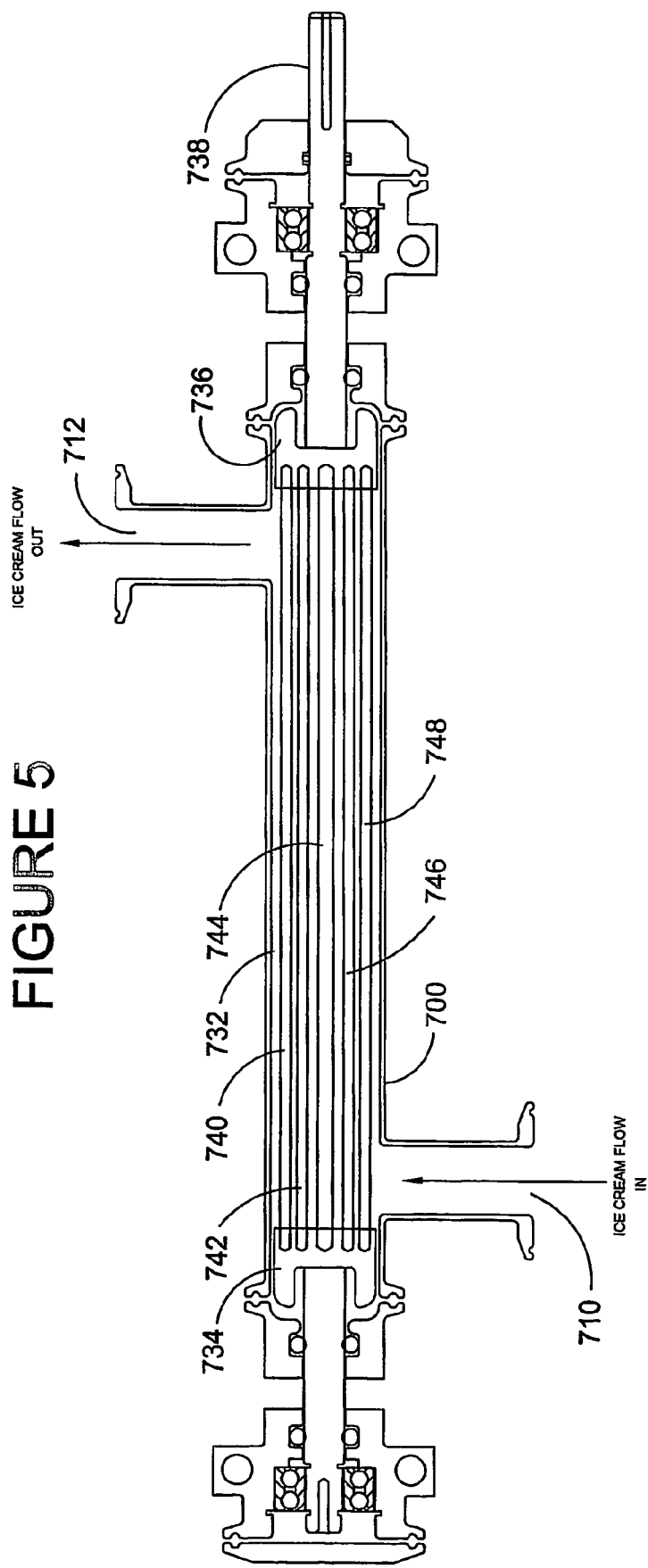
FIG. 5 is a detailed schematic diagram of one of the emulsification barrels shown in FIG. 4.

The emulsification barrels 700, 702, 704, 706, and 708 each contain a whipping assembly that emulsifies soft serve mix flowing through each barrel. The whipping assemblies are rotated by variable speed motors attached to drive shafts of the emulsification barrels 700, 702, 704, 706, and 708. FIG. 5 is a detailed schematic diagram of emulsification barrel 700 in FIG. 4. The other barrels are substantially similar. The emulsification barrel 700 contains a cylindrical mixing chamber 732 extending from one end of the barrel to the other end of the barrel. The chamber contains a whipping assembly comprising two rotatable end pieces 734 and 736 attached to a motor drive shaft 738. The whipping assembly also comprises a number of whipping rods 740, 742, 744, 746, and 748 extending longitudinally through the mixing chamber 732 and attached at each end to the end pieces 734 and 736. Preferably, the whipping rods 740, 742, 744, 746, and 748 are each located at different radial distances from the axis of rotation of the drive shaft 738, as shown in FIG. 5A, so that the mix is uniformly mixed as it travels through the chamber 732. The views in FIG. 5A show additional whipping rods 741, 743, and 745 that are not visible in FIG. 5. In the example of the invention shown in FIGS. 5 and 5A, whipping rods 744 and 745 are at a radius r1, whipping rods 740 and 748 are at a radius r2, and whipping rods 741, 742, 743, and 746 are at a radius r3 with respect to the axis of rotation of drive shaft 738, where $r1 > r2 > r3$. Soft serve mix enters the emulsification barrel 700 through input port 710 connected to the output of emulsification barrel 37, is emulsified by the rotating whipping rods 740, 741, 742, 743, 744, 745, 746, and 748 as it is drawn longitudinally through the mixing chamber 732 by the pump 31, and exits through output port 712. The mix then enters the next emulsification barrel 702 where it undergoes similar emulsification processing.

Freezing Barrel Embodiment

FIG. 6 shows another embodiment of the invention involving the use of a conventional freezing barrel in the storage loop 27 to freeze the mix in the loop 27 instead of cooling the entire compartment 15 containing the loop 27. FIG. 6 shows a freezing barrel 800 in series with serpentine barrel assembly in the storage loop. Refrigeration coils are wrapped around the barrel 800 and are connected to the refrigeration unit 19 by way of lines 802 and 804. The liquid mix from the reservoir 10 and the flavoring from source 6 are frozen in the barrel 800. The mix closest to the inside surface of the barrel 800 and the refrigeration coils freezes first. As the mix is drawn through the barrel 800 by the pump 31, scrapers inside the barrel 800 are driven by motors 730. The scrapers skim the inner surface of the barrel 800 to fold the frozen mix nearest the refrigeration coils into the warmer mix in the center of the barrel 800.

Lubrication is supplied to the bearing on the left hand side of the freezing barrel 800 from line 431 extending from the left hand lubricant output of the emulsification barrel 700. Lubricant flows through the left hand bearing of the barrel 800 and out through line 433. The bearing on the right hand side of the barrel 800 is supplied from line 435 extending from the bearing on the right hand side of the emulsification barrel 37 to the bearing on the right hand side of the freezing barrel 800. Lubricant flows through the right hand side bearing of the freezing barrel 800 and out through line 437 which is connected to the right hand bearing in emulsification barrel 700. The lubrication system in FIG. 6 is in all other respects the same as the lubrication system of FIGS. 1 and 4.

Although FIG. 6 shows the use of a refrigeration barrel with the serpentine barrel assembly like the one in FIG. 4, a refrigeration barrel may also be used with an in-line barrel assembly like the one shown in FIG. 1.

CONCLUSION

Although the description above deals with a number of detailed embodiments of the invention, that description is only meant to be a description of examples of the invention and in no way is intended to limit the scope of the patent coverage defined by the appended claims.

The invention is claimed:

1. A soft serve food product manufacturing, storage, and dispensing machine, comprising:
a source of soft serve food product;
a closed loop circulation system adapted to receive soft serve food product from the source, the closed loop circulation system comprising an emulsification assembly adapted to emulsify the soft serve food product in the closed loop circulation system; and
a dispensing head connected to the closed loop circulation system adapted to dispense the soft serve food product from the closed loop circulation system;
in which the emulsification assembly comprises a plurality of emulsification chambers connected in series;
in which each emulsification chamber has a first end and a second end, an inlet connected to the first end, and an outlet connected to the second end; and
in which said each emulsification chamber contains a rotatable whipping assembly extending from the first end to the second end of the emulsification chamber, the whipping assembly comprising first and second end pieces supporting a plurality of longitudinally extending rods connected between the end pieces, each rod being radially displaced from an axis of rotation of the whipping assembly.

2. A soft serve food product manufacturing, storage, and dispensing machine, comprising:
a source of soft serve food product;
a closed loop circulation system adapted to receive soft serve food product from the source, the closed loop circulation system comprising an emulsification assembly adapted to emulsify the soft serve food product in the closed loop circulation system; and
a dispensing head connected to the closed loop circulation system adapted to dispense the soft serve food product from the closed loop circulation system;
in which the emulsification assembly comprises a plurality of emulsification chambers connected in series;
in which each emulsification chamber contains a rotatable whipping assembly comprising a plurality of longitudinally extending rotatable rods and a plurality of longitudinally extending stationary rods, each rod being radially displaced from an axis of rotation of the whipping assembly, at least some of the rotatable rods being radially displaced from the axis of rotation by unequal amounts.

3. A soft serve food product manufacturing, storage, and dispensing machine, comprising:
a source of soft serve food product;
a closed loop circulation system adapted to receive soft serve food product from the source, the closed loop circulation system comprising:
(a) an emulsification assembly having a first end and a second end, the emulsification assembly adapted to emulsify the soft serve food product in the closed loop circulation system; and
(b) a pump connected between the first and second ends of the emulsification assembly, the pump being adapted to withdraw the soft serve food product from one end of the emulsification assembly and to introduce the soft serve food product withdrawn from the one end of the emulsification assembly into an other end of the emulsification assembly, thereby circulating the soft serve food product in the closed loop circulation system; and
a dispensing head connected to the closed loop circulation system adapted to dispense the soft serve food product from the closed loop circulation system.

4. The machine of claim 3, in which the emulsification assembly comprises at least one chamber containing a plurality of motor driven emulsification elements.

5. The machine of claim 3, further comprising:
a refrigerated compartment enclosing the closed loop circulation system.

6. The machine of claim 3, further comprising:
a refrigerated compartment enclosing the source of soft serve food product, the closed loop circulation system, and at least part of the dispensing head.

7. The machine of claim 5, further comprising:
a refrigeration unit adapted to cool the refrigerated compartment to a predetermined temperature.

8. A machine of claim 7, in which the predetermined temperature is just below the freezing temperature of the soft serve food product.

9. The machine of claim 7, in which the predetermined temperature is between approximately 0° F. and approximately 26° F.

10. The apparatus of claim 3, further comprising:
a clean in place system connected to the closed loop circulation system and adapted to clean the closed loop circulation system.

11. The machine of claim 3, further comprising
at least one mix head adapted to introduce soft serve food product from the source into the emulsification assembly.

12. The machine of claim 11, in which the at least one mix head is further adapted to introduce flavor and overrun gas into the emulsification assembly.

13. The machine of claim 11, in which the at least one mix head is further adapted to introduce cleaning fluid into the emulsification assembly.

14. The machine of claim 3, in which the emulsification assembly comprises a plurality of emulsification chambers connected in series.

15. The machine of claim 14, in which the emulsification chambers define a serpentine path in the closed loop circulation system.

16. The machine of claim 3, further comprising a freezing barrel in the closed loop circulation system.

17. The machine of claim 10, further comprising a refrigerated compartment enclosing the closed loop circulation system and an unrefrigerated compartment enclosing the clean in place system.

18. The machine of claim 4, in which the chamber contains a rotatable emulsification assembly comprising a plurality of rotatable axially extending emulsification elements that are radially displaced from an axis of rotation of the emulsification assembly.

19. The machine of claim 18, in which the chamber further contains a plurality of stationary axially extending emulsification elements adapted to cooperate with the rotatable emulsification elements to provide a shearing action in the emulsification chamber.

20. A soft serve food product manufacturing, storage, and dispensing machine, comprising:
a source of soft serve food product;
a closed loop circulation system adapted to receive soft serve food product from the source, the closed loop circulation system comprising an emulsification assembly adapted to emulsify the soft serve food product in the closed loop circulation system; and
a dispensing head connected to the closed loop circulation system adapted to dispense soft serve food product from the closed loop circulation system;
in which the emulsification assembly comprises a one or more emulsification chambers; and
in which each emulsification chamber contains a rotatable whipping assembly comprising a first plurality of rotatable emulsification elements and a second plurality of emulsification elements, each of an emulsification elements being radially displaced from the axis of rotation of the whipping assembly, the first and second pluralities of emulsification elements being arranged such that a shearing action is created between the first and second pluralities of emulsification elements when the first plurality of emulsification elements is rotated around the axis of rotation of the whipping assembly.

* * * * *